(12) United States Patent
Wada et al.

(10) Patent No.: US 12,094,340 B2
(45) Date of Patent: Sep. 17, 2024

(54) CONTROL DEVICE, PARKING LOT SYSTEM, AND LOCATION ACCURACY CALCULATION METHOD

(71) Applicant: DENSO CORPORATION, Kariya (JP)

(72) Inventors: Masatake Wada, Kariya (JP); Koudai Yamaura, Kariya (JP); Takamasa Hidaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 85 days.

(21) Appl. No.: 17/886,772

(22) Filed: Aug. 12, 2022

(65) Prior Publication Data
US 2022/0392345 A1 Dec. 8, 2022

Related U.S. Application Data

(63) Continuation of application No. PCT/JP2021/003565, filed on Feb. 1, 2021.

(30) Foreign Application Priority Data

Feb. 21, 2020 (JP) ................................. 2020-028457

(51) Int. Cl.
| | |
|---|---|
| *G07C 1/20* | (2006.01) |
| *B60W 30/06* | (2006.01) |
| *G06T 7/70* | (2017.01) |
| *G06V 20/52* | (2022.01) |
| *G06V 20/54* | (2022.01) |
| *G06V 20/58* | (2022.01) |

(Continued)

(52) U.S. Cl.
CPC ............. *G08G 1/148* (2013.01); *B60W 30/06* (2013.01); *G06T 7/70* (2017.01); *G06V 20/52* (2022.01);
(Continued)

(58) Field of Classification Search
USPC ........ 340/301, 307, 310.16, 7.36, 7.28, 5.82, 340/5.32–5.33, 691.6, 679, 661, 636.11,
(Continued)

(56) References Cited

U.S. PATENT DOCUMENTS

| | | | |
|---|---|---|---|
| 6,421,606 B1 * | 7/2002 | Asai ..................... | G08G 1/123 701/410 |
| 2003/0040849 A1 * | 2/2003 | Hathout ............. | B60T 8/17551 701/1 |

(Continued)

FOREIGN PATENT DOCUMENTS

| | | |
|---|---|---|
| JP | 2005291933 A | 10/2005 |
| JP | 2011054116 A | 3/2011 |

(Continued)

OTHER PUBLICATIONS

U.S. Appl. No. 17/886,745, filed Aug. 12, 2022, Wada et al.

*Primary Examiner* — Daniel Previl
(74) *Attorney, Agent, or Firm* — Harness, Dickey & Pierce, P.L.C.

(57) ABSTRACT

A control device for automated valet parking lot includes: a travel route determining unit configured to determine a travel route to a parking space; a travel route transmission unit configured to transmit the travel route to a vehicle; a position acquiring unit configured to acquire, from the vehicle, a position of the vehicle that is estimated by the vehicle while traveling; and a positional accuracy calculation unit configured to calculate a dynamic estimation accuracy, which is an accuracy of the position of the vehicle acquired by the position acquiring unit from the vehicle while the vehicle is travelling, prior to performing automated driving of the vehicle in accordance with the travel route.

12 Claims, 17 Drawing Sheets

(51) Int. Cl.
    *G08G 1/14* (2006.01)
    *H04W 4/12* (2009.01)
(52) U.S. Cl.
    CPC ............ *G06V 20/54* (2022.01); *G06V 20/586* (2022.01); *H04W 4/12* (2013.01); *B60W 2556/20* (2020.02); *G06T 2207/30264* (2013.01)
(58) Field of Classification Search
    USPC .................................................. 340/636.17
    See application file for complete search history.

(56) References Cited

U.S. PATENT DOCUMENTS

| | | |
|---|---|---|
| 2007/0233381 A1 | 10/2007 | Okeya |
| 2014/0340242 A1* | 11/2014 | Belzner ................. G08G 1/147 340/932.2 |
| 2017/0351267 A1 | 12/2017 | Mielenz |
| 2018/0149483 A1* | 5/2018 | Maier ................... B60W 40/10 |
| 2019/0189006 A1 | 6/2019 | Toma et al. |
| 2019/0346273 A1* | 11/2019 | Ishida ..................... G01S 19/51 |
| 2019/0382002 A1* | 12/2019 | Yamazaki ................ G08G 1/16 |
| 2020/0122735 A1* | 4/2020 | Sakaguchi ........... B60W 30/06 |
| 2020/0207334 A1* | 7/2020 | Cho ................. G08G 1/096811 |
| 2020/0207336 A1* | 7/2020 | Oh ......................... G06V 20/52 |
| 2021/0146944 A1* | 5/2021 | Kundu ............... B60W 50/085 |

FOREIGN PATENT DOCUMENTS

| | | |
|---|---|---|
| JP | 2016-192028 A | 11/2016 |
| JP | 2017-117188 A | 6/2017 |
| JP | 2019139331 A | 8/2019 |
| JP | 2019148456 A | 9/2019 |
| WO | WO-2018038131 A1 | 3/2018 |

* cited by examiner

SEQUENCE FOR ENTERING PARKING LOT

SEQUENCE FOR EXITING PARKING LOT

CONTROL DEVICE, PARKING LOT SYSTEM, AND LOCATION ACCURACY CALCULATION METHOD

CROSS REFERENCE TO RELATED APPLICATION

This application is a continuation application of International Patent Application No. PCT/JP2021/003565 filed on Feb. 1, 2021, which designated the U.S. and claims the benefit of priority from Japanese Patent Application No. 2020-028457 filed on Feb. 21, 2020, the disclosure of which is incorporated herein by reference.

TECHNICAL FIELD

The present disclosure relates to a control device, parking lot system, and positional accuracy calculation method.

BACKGROUND ART

There has been known a parking lot management device, which determines a travel route to an empty parking area in the parking lot. The parking lot management device directs the vehicle to the empty parking area by using automatic driving function.

SUMMARY

The present disclosure provides a control device for automated valet parking lot, comprising: a travel route determining unit configured to determine a travel route to a parking space; a travel route transmission unit configured to transmit the travel route to a vehicle; a position acquiring unit configured to acquire, from the vehicle, a position of the vehicle that is estimated by the vehicle while traveling; and a positional accuracy calculation unit configured to calculate a dynamic estimation accuracy, which is an accuracy of the position of the vehicle acquired by the position acquiring unit from the vehicle while the vehicle is travelling, prior to performing automated driving of the vehicle in accordance with the travel route

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
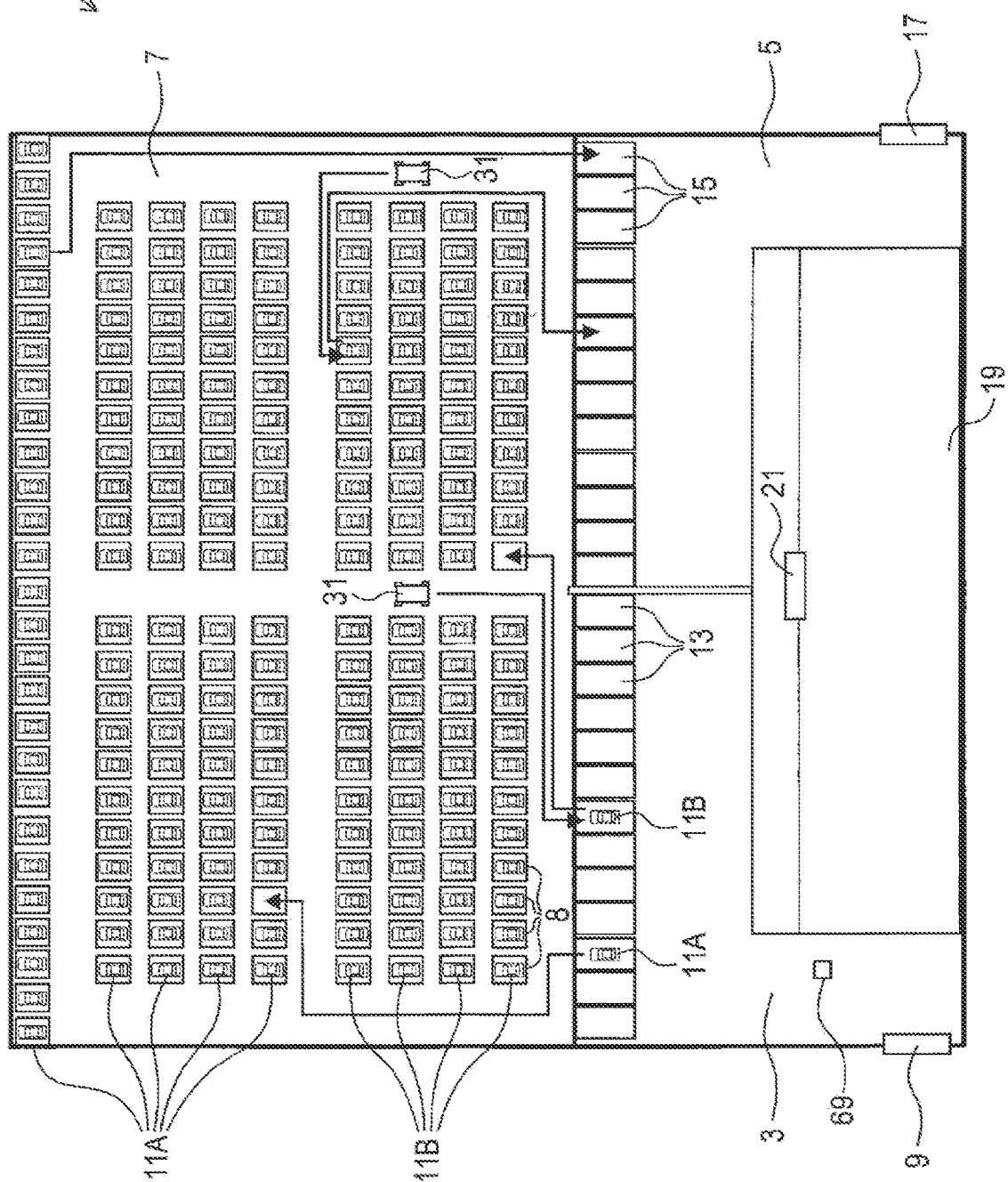
FIG. 1 is an explanatory diagram showing the configuration of an automated valet parking lot according to a first embodiment.

A vehicle directed by a parking lot control device drives automatically along a travel route while repeatedly estimating position of the vehicle using a sensor such as an in-vehicle camera. As a result of the inventor's detailed investigation, it is found that the accuracy of positional estimation of the vehicle (hereinafter referred to as positional estimation accuracy) decreases due to ageing, accidents, dirt, etc, and the vehicle may easily deviate from the travel route during automatic driving.

In one aspect of the present disclosure, it is preferable to provide a technique capable of calculating the positional estimation accuracy of a vehicle.

One aspect of the present disclosure is a control device used in the automated valet parking lot. The control device is provided with a travel route determining unit, a travel route transmission unit, a position acquiring unit, and a positional accuracy calculation unit. The travel route determining unit determines a travel route to a parking space. The travel route transmission unit is configured to transmit the travel route determined by the travel route determining unit to a vehicle. The position acquiring unit is configured to acquire the position of the vehicle, estimated by the vehicle, from the vehicle while travelling. Before the vehicle begins automated driving in accordance with the travel route determined by the travel route determining unit, the positional accuracy calculation unit is configured to calculate the dynamic estimation accuracy, constituting the accuracy of the vehicle position acquired by the position acquiring unit while travelling.

The control device, as an aspect of the present disclosure, calculates the dynamic estimation accuracy as the positional estimation accuracy.

Another aspect of the present disclosure is a positional accuracy calculation method using the control device in the automated valet parking lot. The positional accuracy calculation method is to calculate the dynamic estimation accuracy, which is an accuracy of the position of the vehicle acquired from the vehicle before determining the travel route to the parking space, transmitting the travel route to the vehicle, acquiring the vehicle position estimated by the vehicle, from the vehicle while travelling, and automatically driving the vehicle following the travel route.

The positional accuracy calculation method, as another aspect of the present disclosure, calculates the dynamic estimation accuracy, which can be calculated as the positional estimation accuracy.

Exemplary embodiments of the present disclosure will be described with reference to the drawings.

First Embodiment

1. Configuration of Automated Valet Parking Lot 1

The configuration of the automated valet parking lot 1 will be described with reference to FIG. 1. The automated valet parking lot 1 includes an entry space 3, an exit space 5, and a parking area 7.

The entry space 3 is adjacent to the exit space 5 and the parking area 7. The entry space 3 includes an entrance 9. A to-be-parked vehicle 11 from the outside of the automated valet parking lot 1 passes through the entrance 9 and enters the entry space 3. Regarding the vehicle 11, it may be a vehicle 11A equipped with AVP function and a vehicle 11B without AVP function. AVP function means an automated valet parking function. AVP function includes automatic driving function and automatic parking function.

The entry space 3 includes a plurality of entry sections 13. The plurality of entry sections 13 are arranged on side of the parking area 7 in the entry space 3. Each of the plurality of entry sections 13 has a size capable of accommodating one vehicle 11. The vehicle 11 that entered the entry space 3 from the entrance 9, is able to enter any one of the plurality of entry sections 13 and then stop. In the entry sections 13, the driver gets off from the vehicle 11. The vehicle 11 in the entry sections 13 can be transported by the parking robot 31 as described later. When the vehicle 11 is the vehicle 11A equipped with AVP function, the vehicle 11A can enter the parking area 7 using AVP function.

The exit space 5 includes a plurality of exit sections 15. The plurality of exit sections 15 are arranged on side of the parking area 7 in the exit space 5. Each of the plurality of exit sections 15 has a size capable of accommodating one vehicle 11.

The vehicle 11 leaves the parking area 7 and enters one of the plurality of exit sections 15. The exit space 5 includes an exit 17. In the exit sections 15, the driver gets on the vehicle 11. The vehicle 11 in the exit section 15 passes through the exit 17 to the outside of the automated valet parking lot 1.

The parking area 7 is able to park a plurality of vehicles 11. The parking area 7 includes a plurality of parking space s 8. The parking space 8 is a space for parking one vehicle 11. In the parking area 7, the parking space 8 is marked by a white line or the like. Alternatively, when the position of the parking space 8 is determined by a control device 25 as described later, the parking space 8 may not be marked by a white line or the like.

The entry space 3 and the exit space 5 are adjacent to a facility 19. The facility 19 is, for example, a store, an office, a house, a station, or the like. The entrance/exit 21 of the facility 19 and the entry space 3 are connected by, for example, a pedestrian-only area. The entrance/exit 21 and the exit space 5 are connected by, for example, the pedestrian-only area.

2. Configuration of Control System 23

Figure 2:
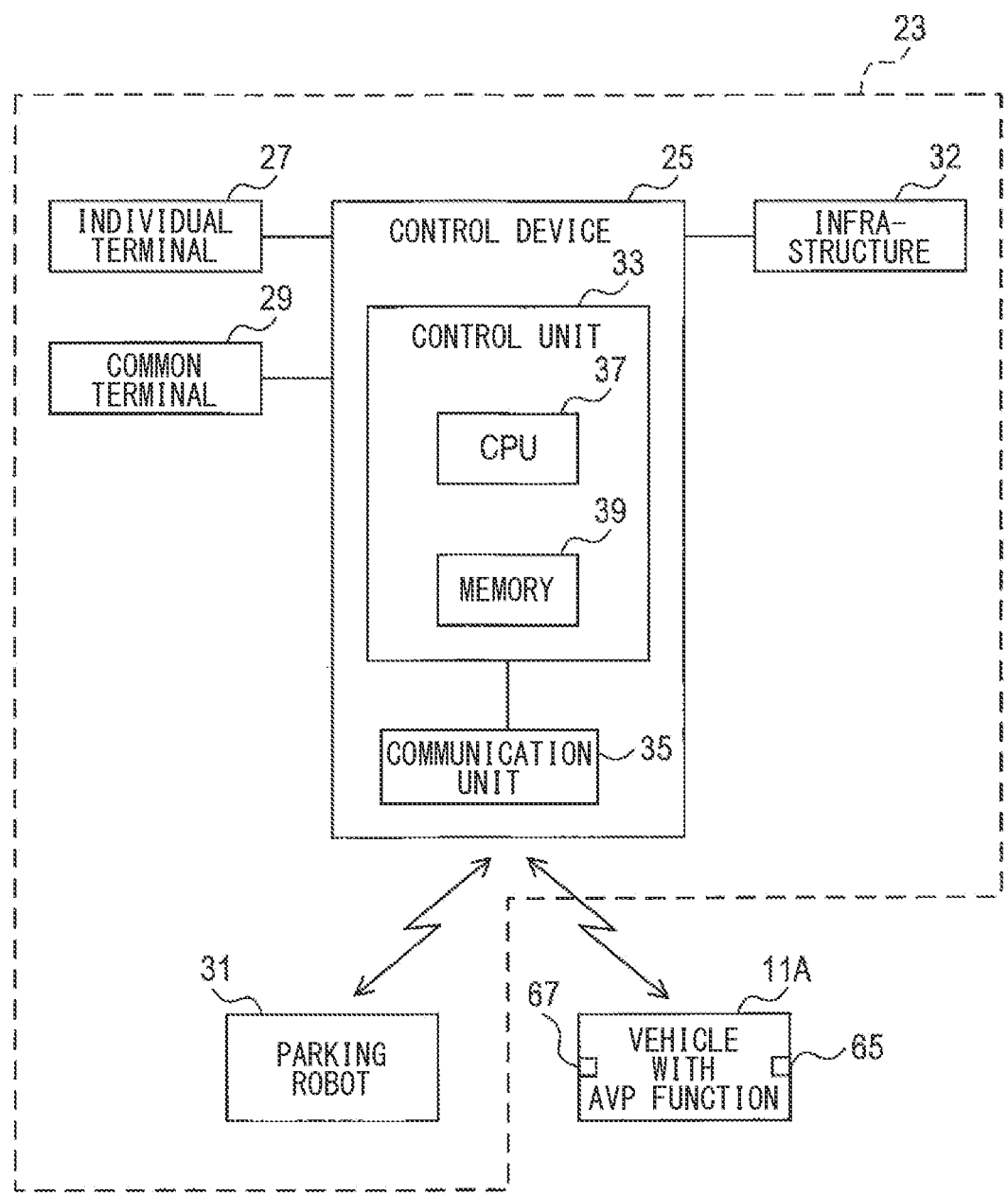
FIG. 2 is a block diagram showing a configuration of a control system.
Figure 3:
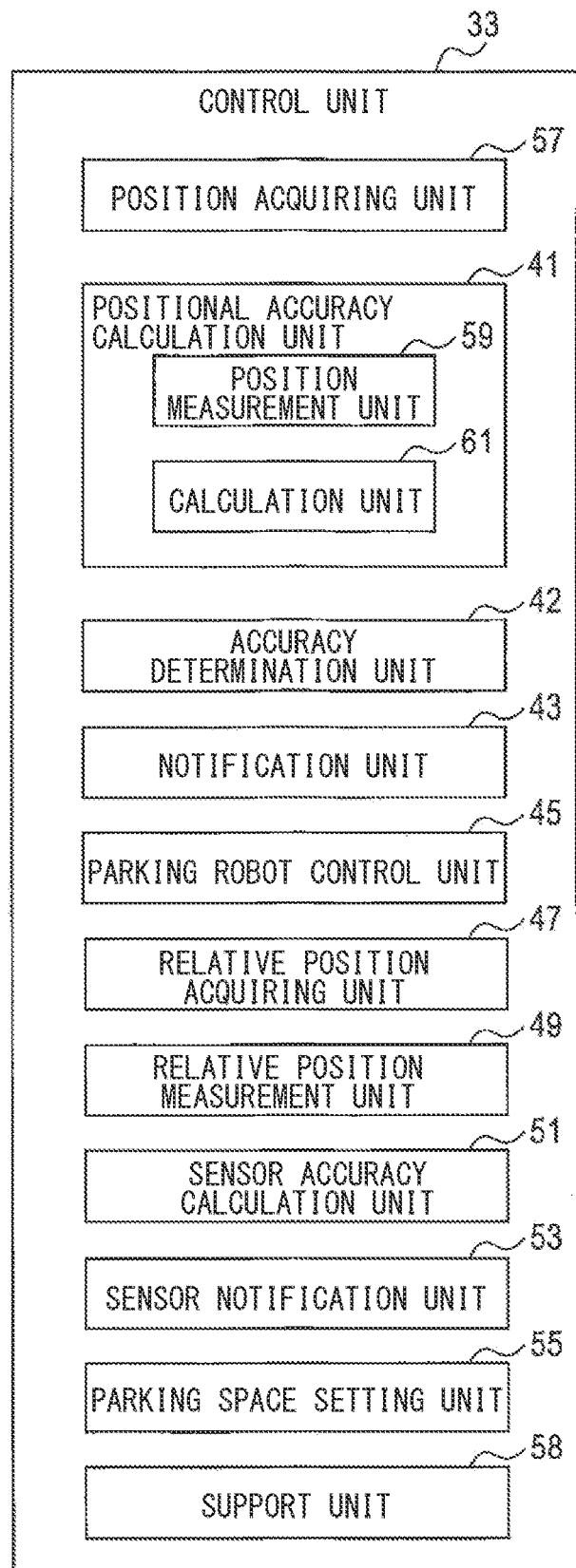
FIG. 3 is a block diagram showing a functional configuration of the control unit in a first embodiment.

The following will describe a configuration of a control system 23 with reference to FIG. 2 to FIG. 3. The control system 23 is used in an automated valet parking lot 1. As shown in FIG. 2, the control system 23 includes the control device 25, a plurality of individual terminals 27, a common terminal 29, a parking robot 31 and an infrastructure 32.

The control device 25 includes a control unit 33 and a communication unit 35. The control unit 33 includes a microcomputer having a CPU 37 and a semiconductor memory (hereinafter referred to as a memory 39), for example, a RAM or a ROM.

The CPU 37 executes a program stored in a non-transitory tangible storage medium to perform functions to be provided by the control unit 33. In this embodiment, the memory 39 corresponds to the non-transitory tangible storage medium in which the programs are stored. By executing this program, a method corresponding to the program is executed. The control unit 33 may include one or more microcomputers.

As shown in FIG. 3, the control unit 33 includes a position acquiring unit 57, a positional accuracy calculation unit 41, an accuracy determination unit 42, a notification unit 43, a parking robot control unit 45, a relative position acquiring unit 47, a relative position measurement unit 49, a sensor accuracy calculation unit 51, a sensor notification unit 53, a parking space setting unit 55, and a support unit 58. The positional accuracy calculation unit 41 includes a position measurement unit 59 and a calculation unit 61.

The communication unit 35 wirelessly communicates with the parking robot 31 and the vehicle 11A with AVP function.

Each of the plurality of individual terminals 27 is associated with one of the plurality of entry sections 13. Each of the individual terminal 27 is provided near the corresponding entry section 13. The individual terminals 27 accept user operation. The user operation includes, for example, entering request operation and inputting user identification information. In addition, the individual terminals 27 display information to the user.

The common terminal 29 is installed in the exit space 5. The common terminal 29 accepts user operation. The user operation includes, for example, exiting request operation and inputting user identification information. In addition, the common terminal 29 displays information to the user.

The parking robot 31 has the following functions. The parking robot 31 communicates wirelessly with the control device 25. The parking robot 31 receives the travel route from the control device 25. The parking robot 31 has map information of the automated valet parking lot 1. The parking robot 31 acquires its own position information. The parking robot 31 travels along the travel route using the map information, the position information, and the travel route.

The parking robot 31 lifts up the vehicle 11. The parking robot 31 travels along the travel route with the lifted vehicle 11. The parking robot 31 travelling with the lifted vehicle 11 corresponds to the parking robot 31 transporting the vehicle 11. The parking robot 31 lowers the lifted vehicle 11 to the road surface, i.e., lift the vehicle down.

The parking robot 31 transmits the position information to the control device 25. The parking robot 31 receives an instruction from the control device 25 and performs the instruction. The instruction includes, for example, stop, start, reroute, and the like.

The infrastructure 32 includes a plurality of sensors for detecting conditions of each part of the automated valet parking lot 1. The sensors include, for example, a camera, a rider, and the like. The camera, the rider, and the like are attached to, for example, a ceiling or a wall of the automated valet parking lot 1. A part of the cameras take photographs for number plates of the vehicles 11 in the entry sections 13. Other part of the cameras take photographs for the vehicles 11 in the entry sections 13 and marker 69 as described later, at the same time. The infrastructure 32 includes a device for guiding the vehicle 11. The guiding device includes, for example, a display device that displays the travelling direction of the vehicle 11.

The vehicle 11A with AVP function includes an in-vehicle camera 65 and an in-vehicle sensor 67. The in-vehicle camera 65 is, for example, a camera that takes photographs in front of the vehicle 11A with AVP function. The in-vehicle camera 65 corresponds to a sensor for estimating the position of the vehicle 11A with AVP function. The vehicle 11A with AVP function uses the in-vehicle camera 65 to capture an area including the marker provided in the automated valet parking lot 1 and generates an image. The vehicle 11A with AVP function measures a relative position of the marker and the vehicle 11A based on the relative position of the marker in the image.

The vehicle 11A with AVP function reads the absolute position of the marker from the map information as described later. The absolute position is a position in a coordinate system fixed with respect to the earth. The vehicle 11A with AVP function estimates its own position from the relative position between the marker and itself, and the absolute position of the marker. The position of the vehicle 11A with AVP function is a position in a coordinate system fixed with respect to the earth. Instead of the position in the coordinate system fixed to the earth, the position in the coordinate system fixed to the automated valet parking lot 1 is also used.

When the automated valet parking is performed by AVP function, the vehicle 11A with AVP function repeatedly estimates the position of the vehicle 11A with AVP function by the above-mentioned method.

The vehicle 11A with AVP function uses the in-vehicle sensor 67 for automatic driving, automated valet parking, or both. The in-vehicle sensor 67 is a millimeter wave sensor in this embodiment. The in-vehicle sensor 67 may be, for example, a camera, a rider, or the like. The in-vehicle camera 65 may be a part of the in-vehicle sensor 67, or may be different from the in-vehicle sensor 67. The in-vehicle sensor 67 may be singular or plural.

3. Processing Related to Entering Performed by the Control System 23 and the Vehicle 11

The processing related to entering executed by the control system 23 and the vehicle 11 will be described with reference to FIGS. 4 to 7.

Figure 4:
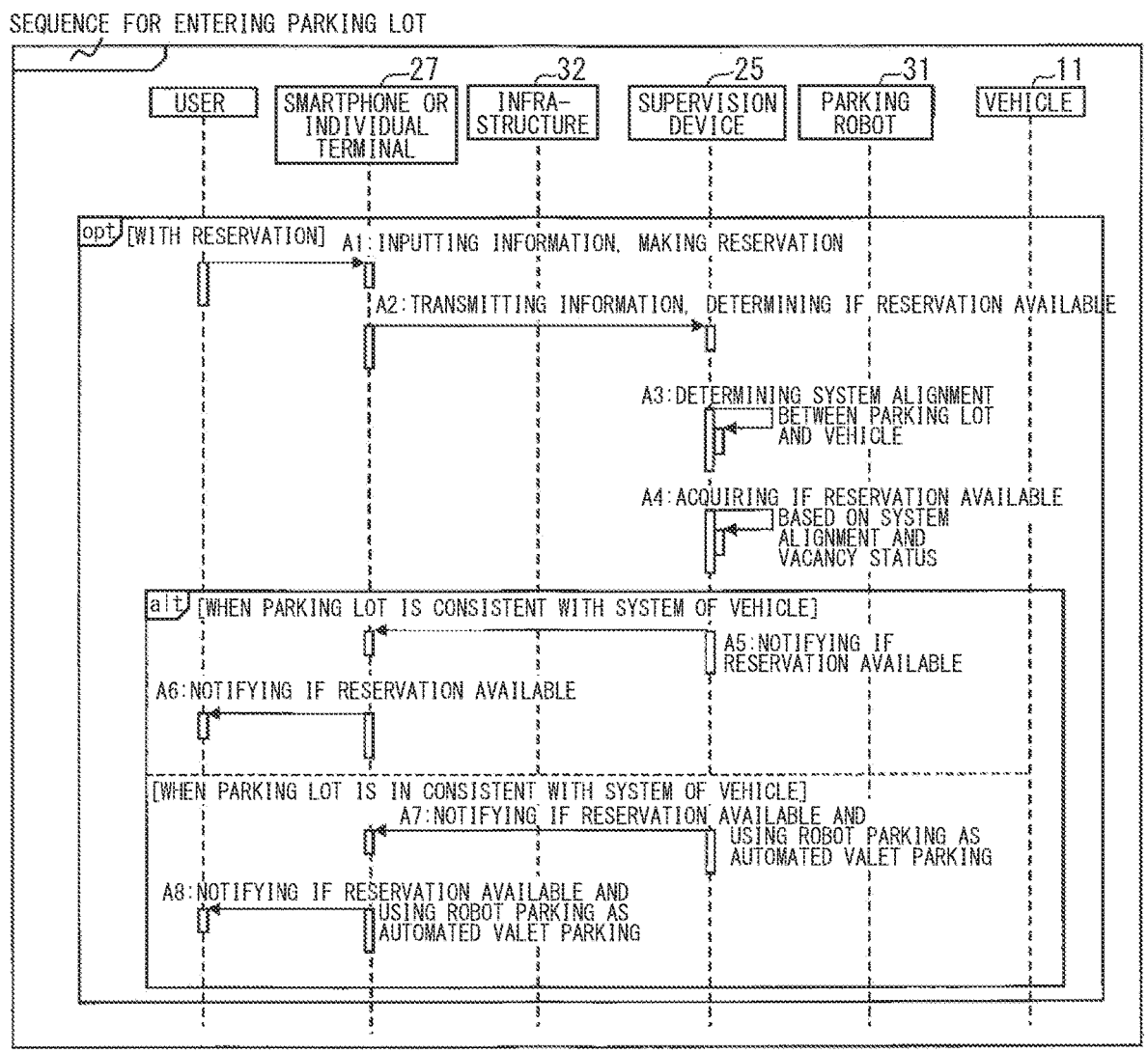
FIG. 4 is a sequence diagram showing process of entering the parking lot performed by the control system and the vehicle according to the first embodiment.
Figure 5:
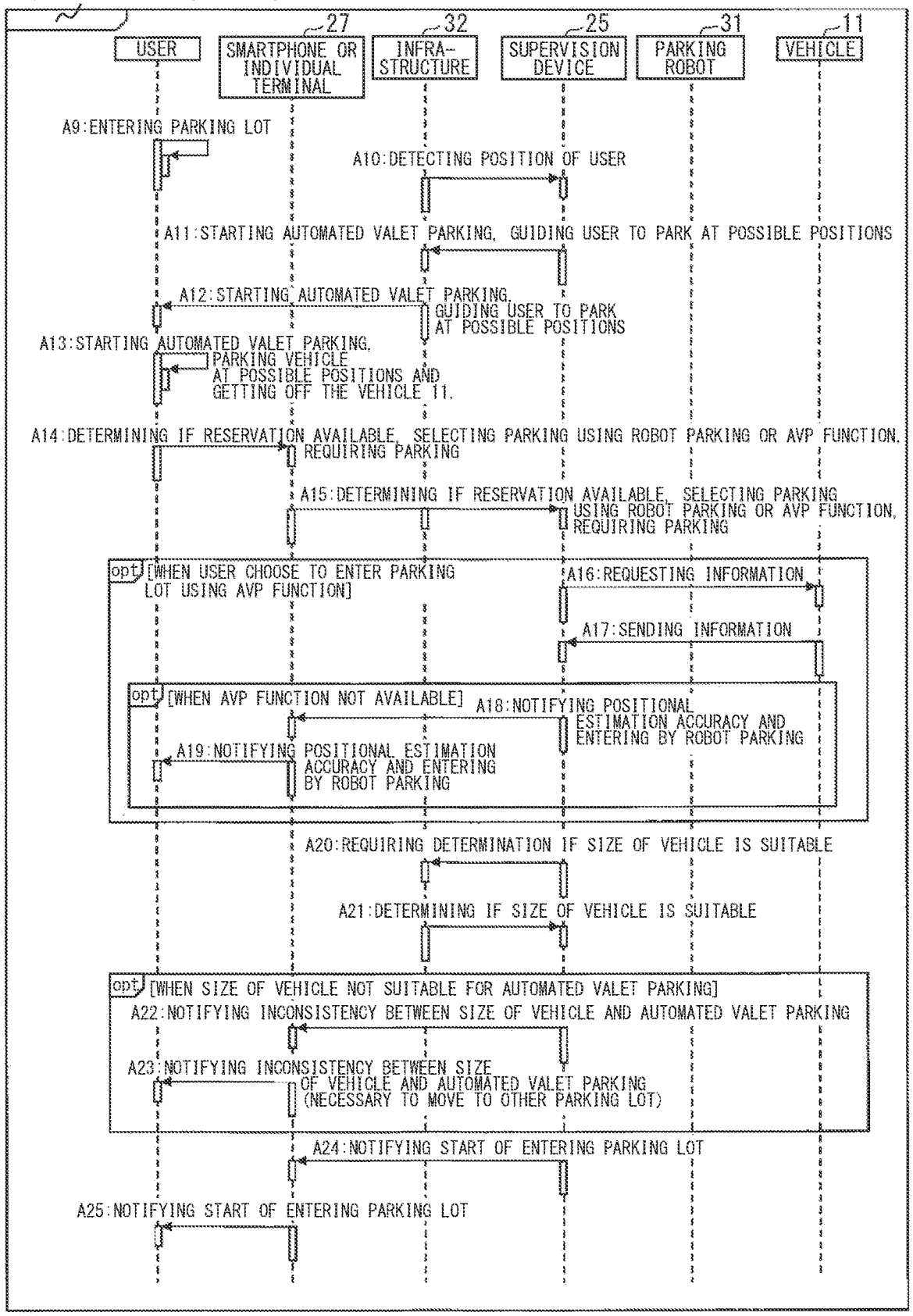
FIG. 5 is a sequence diagram showing process of entering the parking lot performed by the control system and the vehicle in the first embodiment.

When the user makes a reservation for entering, the processes A1 to A8 shown in FIG. 4 are performed. If the user does not make a reservation for entering, the processes A1 to A8 are not performed, and alternatively, processes from A9 shown in FIG. 5 are performed.

In process A1, the user inputs information into the smartphone to make a reservation for entering. Smartphones are carried by the users. The information includes, for example, the identification information of the vehicle 11, the identification information of the user, the scheduled entering time, type of AVP system of the vehicle 11, and the like.

In process A2, the smartphone transmits the input information in the abovementioned process A1 to the control device 25 and inquires whether or not the reservation is possible.

In process A3, the control device 25 confirms the alignment between the parking lot and the vehicle 11 based on the information received in the process A2. The alignment between the parking lot and the vehicle 11 means that the AVP system included in the vehicle 11 and the control system 23 are matched and the AVP function of the vehicle 11 can be used.

In process A4, the control device 25 acquires the vacancy status of the parking area 7, and determines whether or not it is possible to make an entering reservation based on the acquired vacancy status.

The processes A5 and A6 are performed only when the control device 25 determines that the parking lot aligns with the vehicle 11 in process A3. In process A5, the control device 25 notifies the smartphone as to whether or not the reservation is available.

In A6, the smartphone notifies the user whether or not the reservation is possible.

The processes A7 and A8 are performed only when the control device 25 determines that the parking lot does not align with the vehicle 11 in process A3. In process A7, the control device 25 notifies the smartphone as to whether or not the reservation is available. The control device 25 notifies the smartphone that the parking method is robot parking. Robot parking is automated valet parking using the parking robot 31.

In process A8, the smartphone notifies the user whether or not the reservation is possible. The smartphone notifies the user that the parking method is robot parking.

At process A9, the user visits the automated valet parking lot 1. The visit is, for example, refers to the vehicle 11 passing through the entrance 9. When the user visits the automated valet parking lot 1, the user is in the vehicle 11 and is driving the vehicle 11.

In process A10, the infrastructure 32 detects the positions of the user and the vehicle 11. The infrastructure 32 notifies the control device 25 regarding the positions of the user and the vehicle 11.

In process A11, the control device 25 instructs the infrastructure 32 to guide the user and the vehicle 11 to a position where automated valet parking is possible. The position where automated valet parking is possible, is one of the entry sections 13.

In process A12, the infrastructure 32 displays, for example, one of the entry sections 13 and guides the user and the vehicle 11 to the position where automated valet parking is possible.

In process A13, the user parks the vehicle 11 in any one of the entry sections 13 and gets off the vehicle 11. Each of the entry sections 13 corresponds to a position possible for automated valet parking.

In process A14, the user inputs information to the individual terminal 27. The information includes whether or not there is a reservation, reservation number if the reservation exists, parking method, entering request, etc. The parking method is either robot parking or parking by AVP function. The user may input these information through the smartphone.

In process A15, the individual terminal 27 transmits the information input in the process A14 to the control device 25. The smartphone transmits the information input in the process A14 to the control device 25.

When the user selects parking by AVP function, processes A16 to A19 are performed. When the user selects robot parking, processes A16 to A19 are not performed. The vehicle 11 executing processes A16 to A19 is a vehicle 11A with AVP function.

Figure 10:
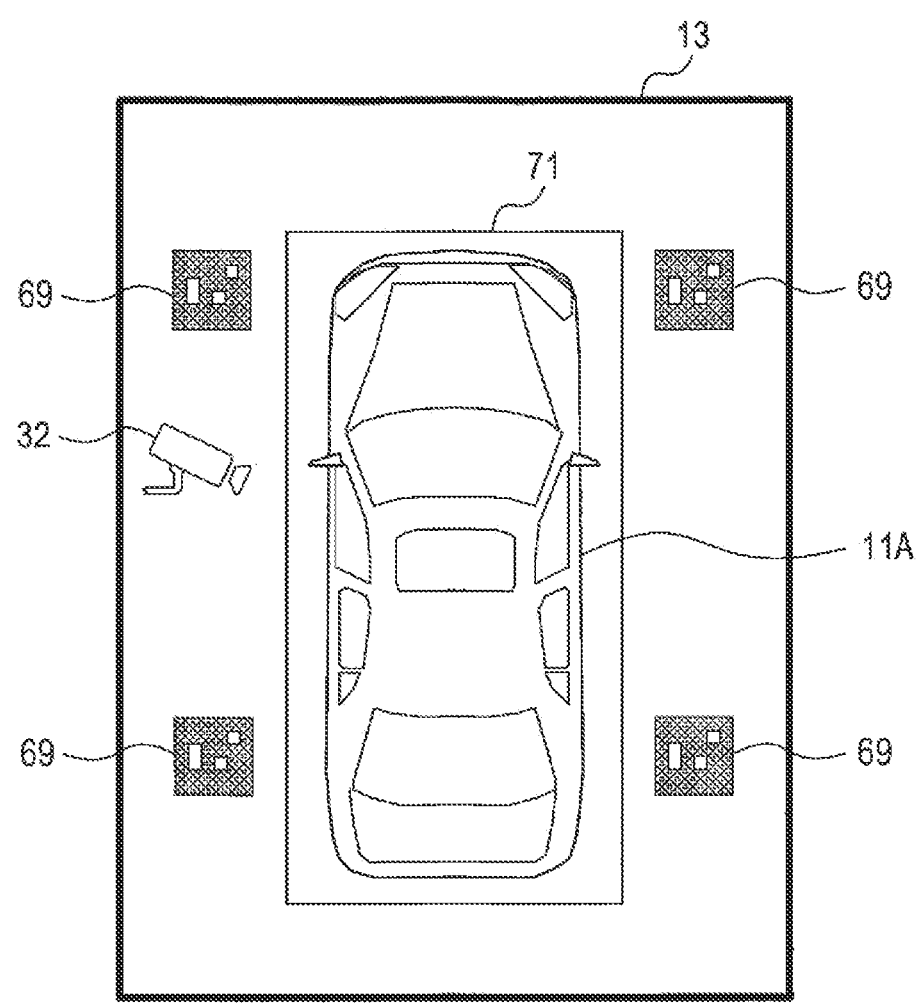
FIG. 10 is an explanatory diagram showing a configuration of entry space of the parking lot.

In process A16, firstly, the control device 25 transmits the map information of the entry sections 13 to the vehicle 11. The map information of the entry sections 13 specifies the position and the type of the marker 69 for each of the entry sections 13. The map information of the entry sections 13 specifies position of obstacles in the entry sections 13. As shown in FIG. 10, each of the entry sections 13 is provided with a marker 69 and a white line 71. Markers 69 and white lines 71 are drawn on the floor. The marker 69 corresponds to the reference position in the automated valet parking lot 1.

The shape of the white line 71 is, for example, a rectangle or a shape representing a portion corresponding to a corner of the rectangle. When the vehicle 11 stops inside the white line 71, the in-vehicle camera 65 takes a picture of the marker 69, and the in-vehicle sensor 67 detects the marker 69 and the white line 71. The white line 71 corresponds to the guidance unit. The inside of the white line 71 corresponds to a pre-determined position of the vehicle 11 when calculating the positional estimation accuracy. The combination of the control device 25 and the white line 71 corresponds to the parking lot system.

The control device 25 requests the vehicle 11 to transmit information. The information includes (a) the position of the vehicle 11 estimated by the vehicle 11 using the in-vehicle camera 65, (b) the relative position between the marker 69 and the vehicle 11 estimated by the vehicle 11 using the in-vehicle sensor 67, and (c) information regarding whether or not the parking lot and the vehicle 11 are aligned.

The vehicle 11 creates the above information (a) as follows. The vehicle 11 captures a range including the marker 69 using the in-vehicle camera 65 and generates an image. The vehicle 11 measures a relative position of the marker 69 and the vehicle 11 based on the relative position of the marker 69 in the image. In the image, the direction of the marker 69 with respect to the vehicle 11 is not limited. For example, the marker 69 may be in front of the vehicle 11 or behind the vehicle 11.

The vehicle 11 reads the absolute position of the marker 69 from the map information of the entry sections 13. The vehicle 11 estimates the position of the vehicle 11 from the relative positions of the marker 69 and the vehicle 11, and the absolute position of the marker 69.

Examples of method for estimating the position of the vehicle 11 are shown as below. The markers 69 drawn in the entry space 3 and in the entry sections 13 have different shapes. The map information has node information corresponding to the markers 69. The node information includes the shape of the markers 69 and the absolute position information of the markers 69. The vehicle 11 recognizes the shape of the markers 69 in the captured image. The vehicle 11 extracts node information with the recognized shape and determines the absolute position of the markers 69. The vehicle 11 recognizes the relative distance between the vehicle 11 and the marker 69 from the captured image, and estimates the absolute position of the vehicle 11.

The vehicle 11 creates the above information (b) as follows. The vehicle 11 detects a detecting target such as the markers 69 by the in-vehicle sensor 67. The vehicle 11 measures the relative position between the marker 69 and the vehicle 11 based on the detection result of the in-vehicle sensor 67. Depending on the type of the in-vehicle sensor 67, different objects are detected by the in-vehicle sensor 67. When the in-vehicle sensor 67 is a millimeter-wave sensor as in the present embodiment, the in-vehicle sensor 67 detects distance to an obstacle instead of the marker 69.

In process A17, the vehicle 11 transmits the information (a)-(c) to the control device 25. The control device 25 receives the information (a)-(c) from the vehicle 11.

Figure 11:
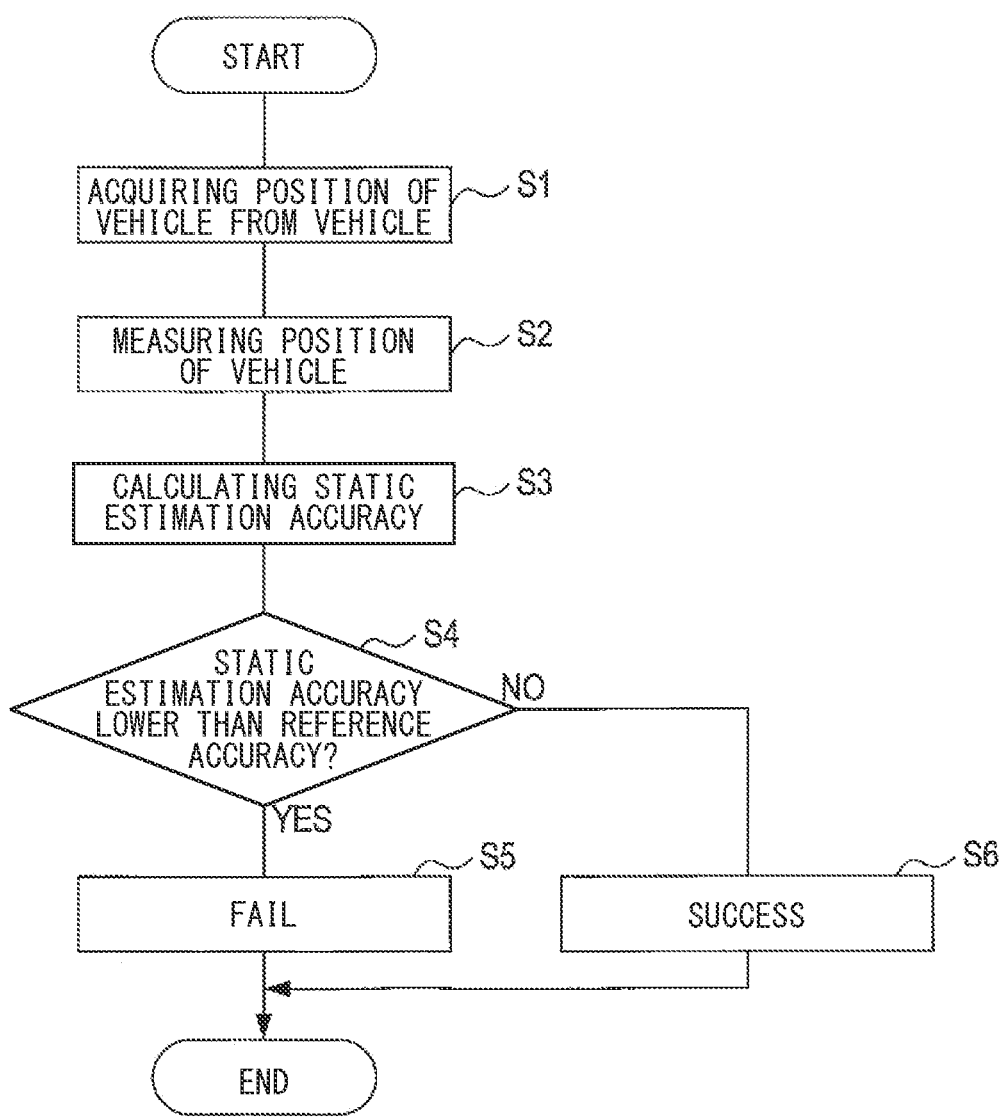
FIG. 11 is a flowchart showing a processes of calculating the static estimation accuracy.

The control device 25 calculates the positional estimation accuracy based on the above information (a) received from the vehicle 11. The positional estimation accuracy is the accuracy with which the vehicle 11 estimates its own position. In the present embodiment, the static estimation accuracy, which is the position estimation accuracy when the vehicle 11 is stationary, is calculated as the positional estimation accuracy. The process of calculating the static estimation accuracy by the control device 25 is described with reference to FIG. 11.

In step 1, the position acquiring unit 57 acquires the position of the vehicle 11 estimated by the vehicle 11 from the above information (a) when the vehicle 11 is stationary.

In step 2, the position measurement unit 59 measures the position of the stationary vehicle 11 using the infrastructure 32. Since the vehicle 11 has been stopped in processes A16 and A17, the position of the vehicle 11 measured by the infrastructure 32, is the same as the position of the vehicle 11 measured in process A16.

In step 3, the calculation unit 61 calculates the static estimation accuracy based on the difference between the position of the vehicle 11 acquired in step 1 and the position of the vehicle 11 measured in step 2. The smaller the difference, the higher the static estimation accuracy.

In step 4, the accuracy determination unit 42 determines whether or not the static estimation accuracy calculated in step 3 is less than the pre-determined static reference accuracy. If the static estimation accuracy is less than the static reference accuracy, step 5 is executed. If the static estimation accuracy is higher than the static reference accuracy, step 6 is executed.

In step 5, the accuracy determination unit 42 determines that the static estimation accuracy is failed.

In step 6, the accuracy determination unit 42 determines that the static estimation accuracy is succeeded.

In the above process, the position of the vehicle 11 acquired in step 1 and the position of the vehicle 11 measured in step 2 are absolute positions. The position of the vehicle 11 acquired in step 1 and the position of the vehicle 11 measured in step 2 may also be relative positions. Examples of the relative positions include a position where the vehicle 11 is 50 cm to the right of the marker 69, a position where the vehicle 11 is 30 cm to the left of the marker 69, and the like.

Figure 12:
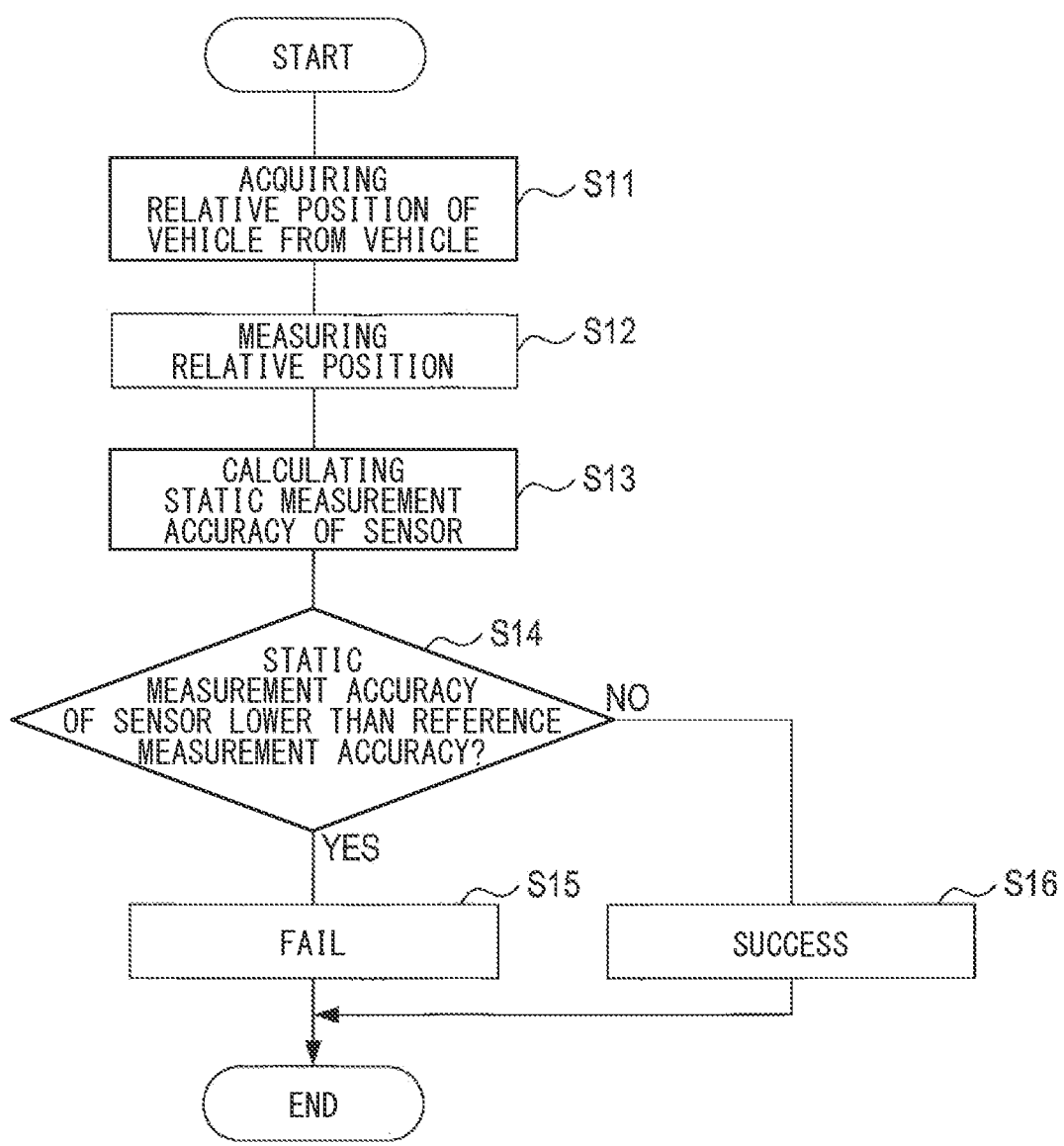
FIG. 12 is a flowchart showing a processes of calculating the static measurement accuracy by an in-vehicle sensor.

The control device 25 calculates the positional estimation accuracy of the in-vehicle sensor 67 based on the above information (b) received from the vehicle 11. In the present embodiment, the static measurement accuracy, which is the measurement accuracy of the in-vehicle sensor 67 when the vehicle 11 is stationary, is calculated as the measurement accuracy of the in-vehicle sensor 67. The process of calculating the static measurement accuracy of the in-vehicle sensor 67 is described with reference to FIG. 12.

In step 11, the relative position acquiring unit 47 acquires the relative position of the marker 69 and the stationary vehicle 11 from the above information (b).

In step 12, the relative position measurement unit 49 measures the relative position of the marker 69 and the stationary vehicle 11 using the infrastructure 32. Since the vehicle 11 has been stopped in A16 and A17, the position of the vehicle 11 when the infrastructure 32 measures its relative position, is the same as the position of the vehicle 11 when the vehicle 11 measures its relative position in process A16.

In step 13, the sensor accuracy calculation unit 51 calculates the static measurement accuracy of the in-vehicle sensor 67 based on the difference between the relative position acquired in step 11 and the relative position measured in step 12. The smaller the difference, the higher the static measurement accuracy.

In step 14, the accuracy determination unit 42 determines whether or not the static measurement accuracy of the in-vehicle sensor 67 calculated in step 13 is less than the pre-determined static reference measurement accuracy. If the static measurement accuracy is less than the reference measurement accuracy, step 15 is executed. If the static measurement accuracy is higher than the reference static measurement accuracy, step 16 is executed.

In step 15, the accuracy determination unit 42 determines that the static measurement accuracy of the in-vehicle sensor 67 is failed.

In step 16, the accuracy determination unit 42 determines that the static measurement accuracy of the in-vehicle sensor 67 is succeeded.

When it is determined that the static estimation accuracy is failed, when it is determined that the static measurement accuracy of the in-vehicle sensor 67 is failed, or when the above information (c) is inconsistent with the parking lot and the vehicle 11, the processes A18 and A19 are performed. In other cases, the processes A18 and A19 are not performed.

In process A18, the control device 25 notifies the individual terminals 27. The specific contents of the notification are shown below. When it is determined that the static estimation accuracy has failed, the notification unit 43 notifies the individual terminals 27 that the static estimation accuracy has failed. When it is determined that the static measurement accuracy of in-vehicle sensor 67 has failed, the sensor notification unit 53 notifies the individual terminals 27 that the static measurement accuracy of the in-vehicle sensor 67 has failed. When the content of the information (c) is not consistent with the parking lot and the vehicle 11, the control device 25 notifies the individual terminals 27 of the content. The control device 25 notifies the individual terminals 27 that the parking method is robot parking. The control device 25 may notify the smartphone.

In process A19, the individual terminal 27 notifies the user of the notification received from the control device 25 by the individual terminal 27 in the abovementioned process A18. The smartphone may notify the user.

In process A20, the control device 25 requests the infrastructure 32 to confirm whether or not the size of the vehicle 11 can be accommodated. "Available" means that automated valet parking is available in the automated valet parking lot 1.

In process A21, the infrastructure 32 confirms whether or not the size of the vehicle 11 can be accommodated, and transmits the confirmation result to the control device 25.

If the answer of the confirmation in process A21 is that the size of the vehicle 11 cannot be accommodated, the processes A22 and A23 are executed, and the process ends. If the answer of the confirmation in process A21 is that the size of the vehicle 11 can be accommodated, the processes A22 and A23 are not executed, and the process A24 is continuously executed.

In process A22, the control device 25 notifies the individual terminal 27 that automated valet parking is not possible because the size of the vehicle 11 is not suitable. The control device 25 may notify the smartphone.

In process A23, the individual terminal 27 notifies the user that automated valet parking is not possible because the size of the vehicle 11 is not suitable. The individual terminal 27 requests the user to move to another parking lot. The smartphone may also notify the user and request the user.

In process A24, the control device 25 notifies the individual terminals 27 of start of entering the parking area. The control device 25 may notify the smartphone.

In process A25, the individual terminal 27 notifies the user of the start of entering the parking area. The smartphone may notify the user of the start of entering the parking area.

Figure 6:
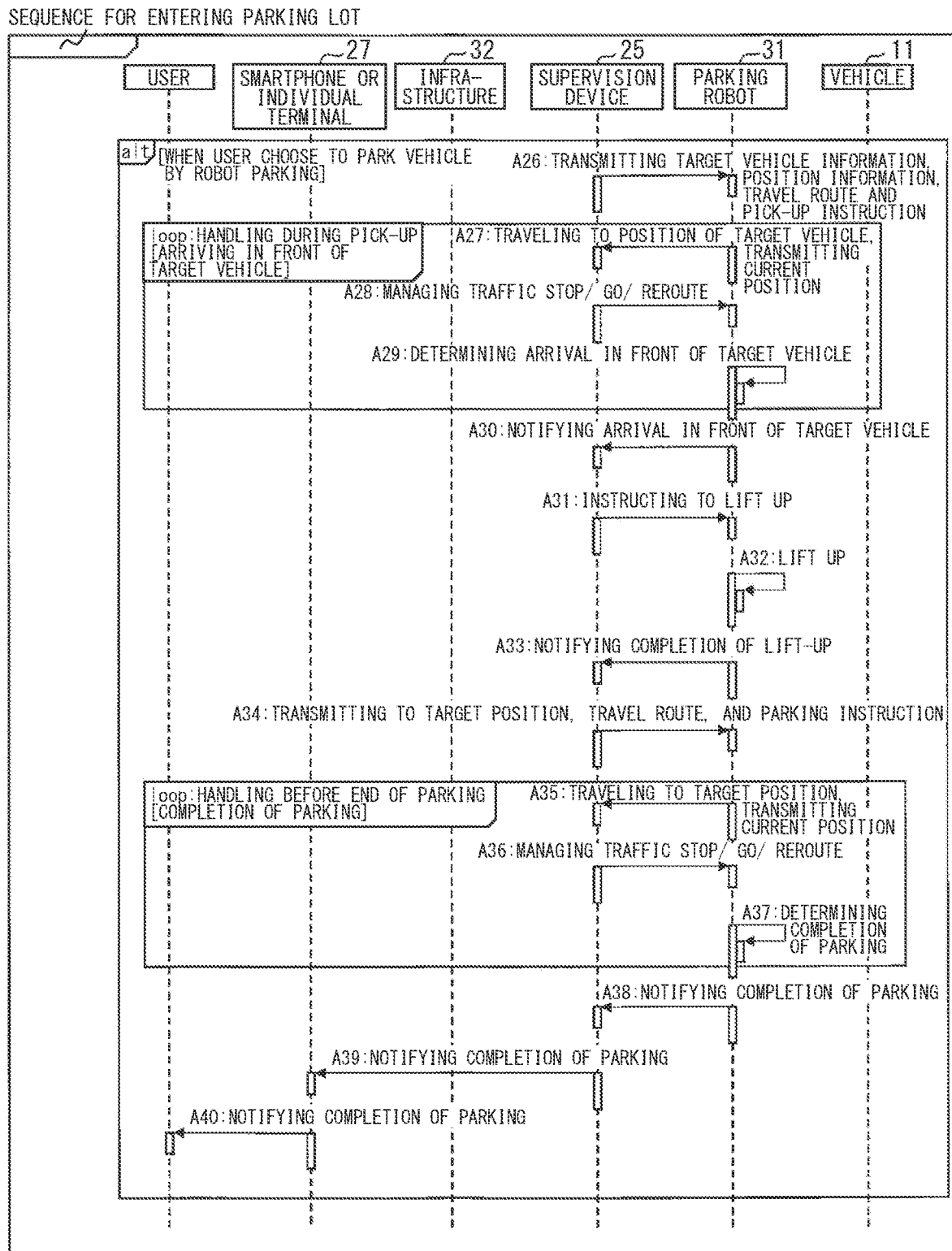
FIG. 6 is a sequence diagram showing process of entering the parking lot performed by the control system and the vehicle in the first embodiment.
Figure 7:
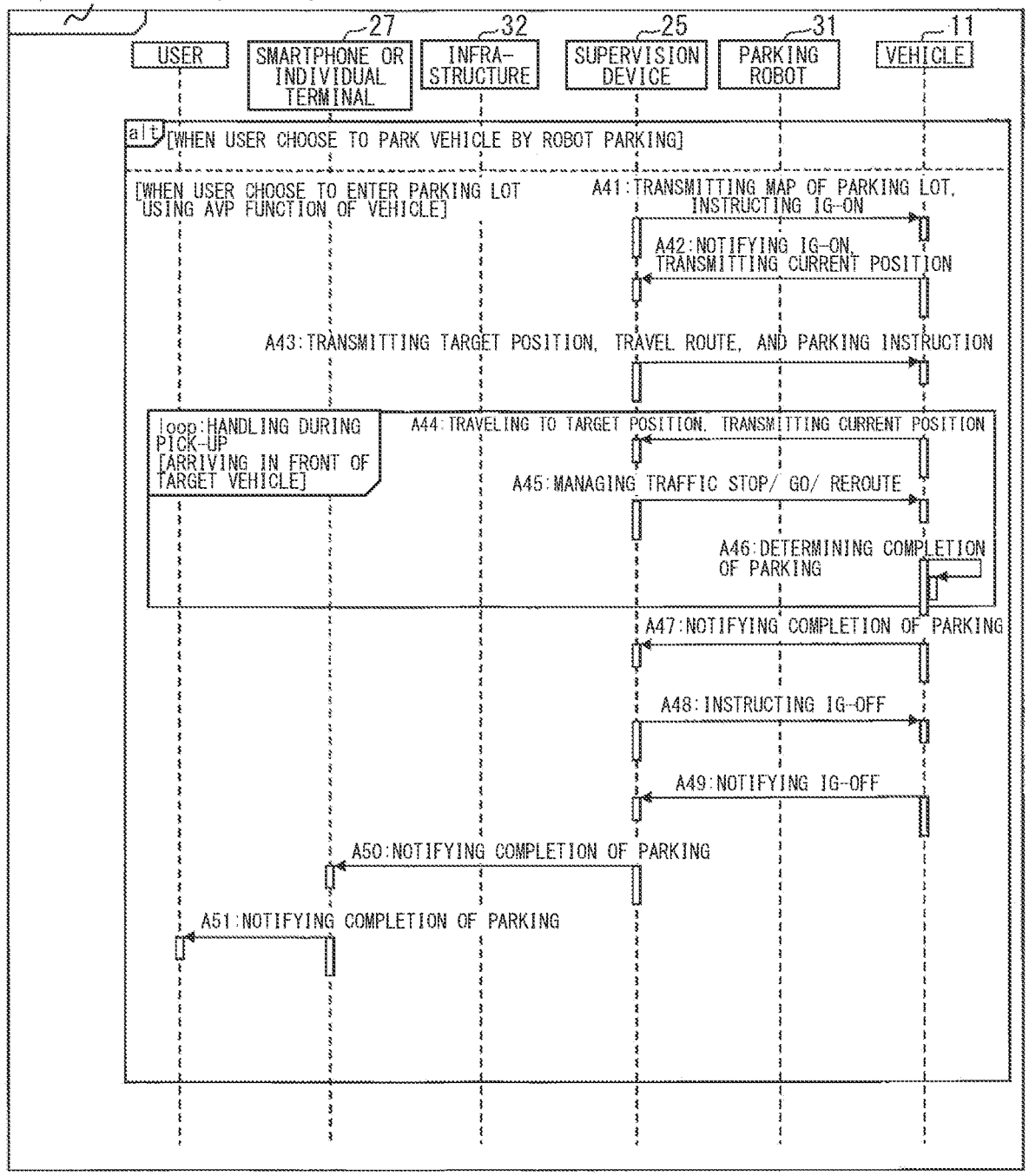
FIG. 7 is a sequence diagram showing process of entering the parking lot performed by the control system and the vehicle in the first embodiment.

When the user selects robot parking, or when the robot parking is notified in process A19, the processes A26 to A40 as shown in FIG. 6 are performed. When the user selects parking by AVP function and the robot parking is not notified in the process A19, the processes A41 to A51 as shown in FIG. 7 are performed. The vehicle 11 executing processes A41 to A51 is the vehicle 11A with AVP function.

In process A26, the control device 25 transmits target vehicle information, the position information, the travel route, and pick-up instruction to the parking robot 31. The target vehicle information is information about target vehicle. The target vehicle is the vehicle 11 that is about to be parked. The position information is position information indicating the current position of the target vehicle. The travel route is a travel route from the current position of the parking robot 31 to the current position of the target vehicle. The pick-up instruction is an instruction to pick up the target vehicle.

The processes A27-A29 are repeated until the parking robot 31 arrives in front of the target vehicle. In process A27, the parking robot 31 travels toward the target vehicle position and transmits the current position of the parking robot 31 to the control device 25.

In process A28, the control device 25 manages traffic based on the current position of the parking robot 31 received in process A27. The control device 25 transmits instructions to stop, start, and reroute to the parking robot 31 as necessary. The parking robot 31 stops, starts, and reroutes according to the instruction.

In process A29, the parking robot 31 determines whether or not the parking robot 31 has arrived in front of the target vehicle. When the parking robot 31 has not yet arrived in front of the target vehicle, the process returns to process A27. When the parking robot 31 arrives in front of the target vehicle, the processes A27-A29 are completed, and the process A30 is executed.

In process A30, the parking robot 31 notifies the control device 25 as to the parking robot 31 has arrived in front of the target vehicle.

In process A31, the control device 25 instructs the parking robot 31 to lift up the target vehicle.

In process A32, the parking robot 31 lifts up the target vehicle. When the target vehicle is lifted up, process A33 is executed.

In process A33, the parking robot 31 notifies the control device 25 of the completion of lifting up.

In process A34, the control device 25 transmits target parking position information, travel route, and parking instruction to the parking robot 31. The target parking position information is information indicating the target parking position. The target parking position is a parking position where the vehicle 11 is going to be parked. The travel route is a travel route from the current position of the parking robot 31 to the target parking position. The parking instruction is an instruction to park the target vehicle at the target parking position.

The processes A35-A37 are repeated until the parking robot 31 arrives at the target parking position. In process A35, the parking robot 31 travels toward the target parking position and transmits the current position of the parking robot 31 to the control device 25.

In process A36, the control device 25 manages traffic based on the position of the parking robot 31 received in process A35. The control device 25 transmits instructions to stop, start, and reroute to the parking robot 31 as necessary. The parking robot 31 stops, starts, and reroutes according to the instruction.

In process A37, the parking robot 31 determines whether or not the parking robot 31 has arrived at the target parking position. When the parking robot 31 has not yet arrived at the target parking position, the process returns to process A35. When the parking robot 31 arrives at the target parking position, the processes A35-A37 are completed, and the process A38 is executed.

In process A38, the parking robot 31 notifies the control device 25 of completion of the parking.

In process A39, the control device 25 notifies the individual terminals 27 of the completion of the parking. The control device 25 may notify the smartphone of the completion of the parking.

In process A40, the individual terminal 27 notifies the user of completion of the parking. The smartphone may notify the user of the completion of the parking.

In process A41, the control device 25 distributes parking lot map to the vehicle 11 and transmits an ignition-on instruction that instructs the vehicle 11. The parking lot map is map information of the automated valet parking lot 1. The ignition-on instruction is an instruction to turn on the ignition of the vehicle 11. The vehicle 11 receives the parking lot map. The vehicle 11 turns on the ignition in response to the ignition on instruction.

In process A42, the vehicle 11 transmits ignition on notification and its own position to the control device 25. The ignition on notification is a notification that the ignition of the vehicle 11 is on. Its own position is the position of the vehicle 11 estimated by the vehicle 11.

In process A43, the control device 25 transmits target parking position, travel route, and parking instruction to the vehicle 11. The travel route is a travel route from the current position of the vehicle 11 to the target parking position. The target parking position is any one of the plurality of parking space s 8. The parking instruction is an instruction to travel along the travel route and park at the target parking position.

The processes A44-A46 are repeated until the vehicle 11 arrives at the target parking position. In process A44, the vehicle 11 travels toward the target parking position and transmits the current position of the vehicle 11 to the control device 25. The current position of vehicle 11 is the position of the vehicle 11 estimated by the vehicle 11.

In process A45, the control device 25 manages traffic based on the current position of the vehicle 11 received in process A44. The control device 25 transmits instructions to stop, start, and reroute to the vehicle 11 as necessary. The vehicle 11 stops, starts, and reroutes according to the instruction.

In process A46, the vehicle 11 determines whether or not the vehicle 11 has arrived at the target parking position. When the vehicle 11 has not yet arrived at the target parking position, the process returns to process A44. When the vehicle 11 arrives at the target parking position, the processes A44-A46 are completed, and the process A47 is executed.

In process A47, the vehicle 11 notifies the control device 25 of completion of the parking.

In process A48, the control device 25 instructs the vehicle 11 to turn off the ignition. The vehicle 11 turns off the ignition.

In process A49, the vehicle 11 notifies the control device 25 that the ignition has been turned off.

In process A50, the control device 25 notifies the individual terminals 27 of the completion of the parking. The control device 25 may notify the smartphone of the completion of the parking.

In process A51, the individual terminal 27 notifies the user of the completion of the parking. The smartphone may notify the user of the completion of the parking.

Among the processes executed by the control device 25, the process of setting the target parking position (i.e., parking space 8) is executed by the parking space setting unit 55.

The processes A26-A28, A30, A31, A33-A36, and A38-A39 correspond to controlling, by the parking robot control unit 45, the parking robot 31 to travel from the entry sections 13 to the target parking position. The processes A41-A45 and A47-A50 corresponds to supporting, by the support unit 58, the vehicle 11A with AVP function to travel from the entry sections 13 to the target parking position.

The support provided by the support unit 58 means, for example, providing various instructions and information necessary for the vehicle 11A with AVP function to travel from the entry sections 13 to the target parking position. Examples of the instructions include the abovementioned pick-up instruction, the stop, start, reroute instruction, the lift-up instruction, the parking instruction, the ignition on instruction, the instruction to turn ignition off, and the like. Examples of the information include the position information of the target vehicle, the travel route, the target parking position information, the parking lot map, and the like. The support unit 58 also determines the travel route. The support unit 58 corresponds to the travel route determining unit and the travel route transmission unit.

Figure 8:
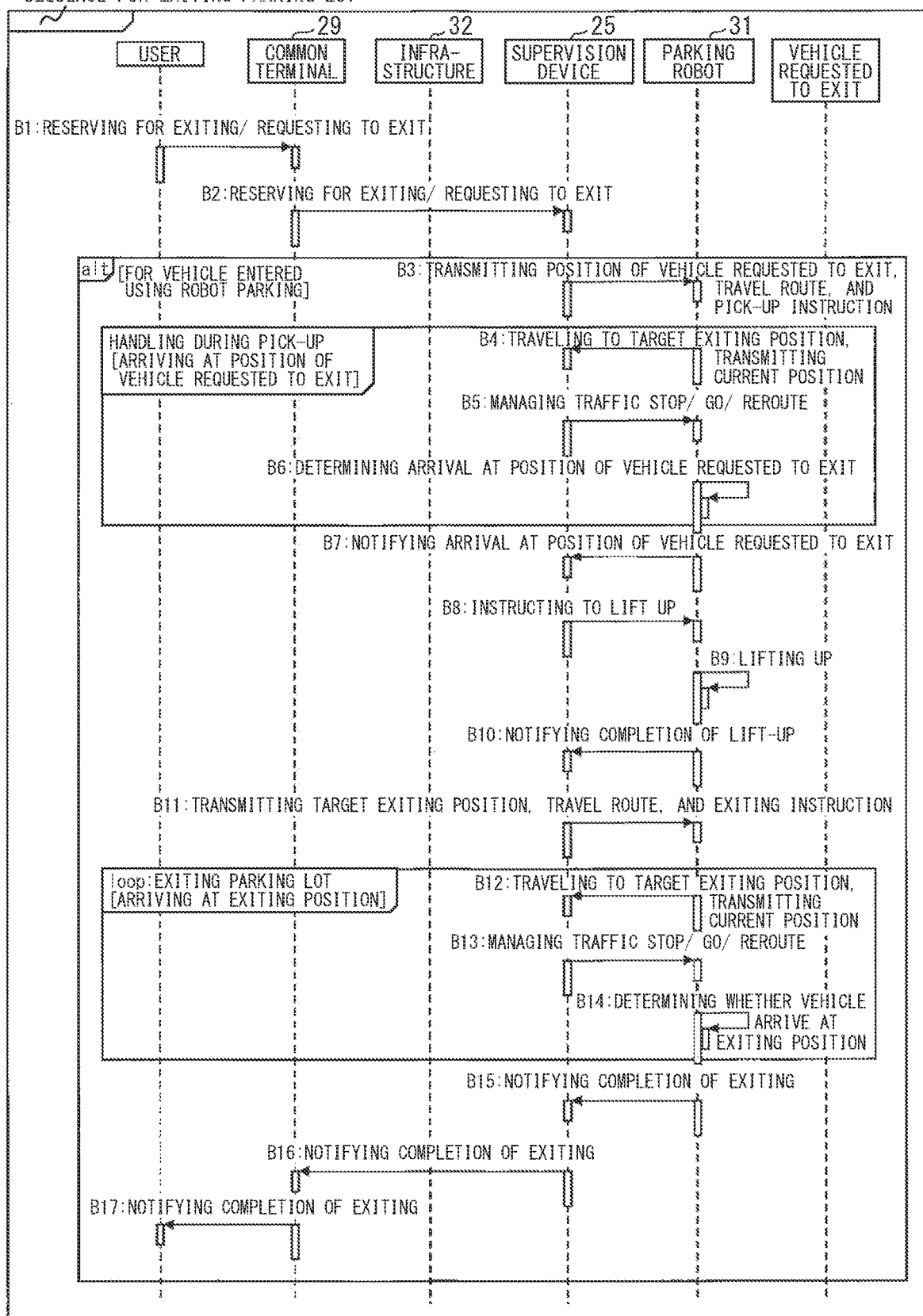
FIG. 8 is a sequence diagram showing process of exiting the parking lot performed by the control system and the vehicle.
Figure 9:
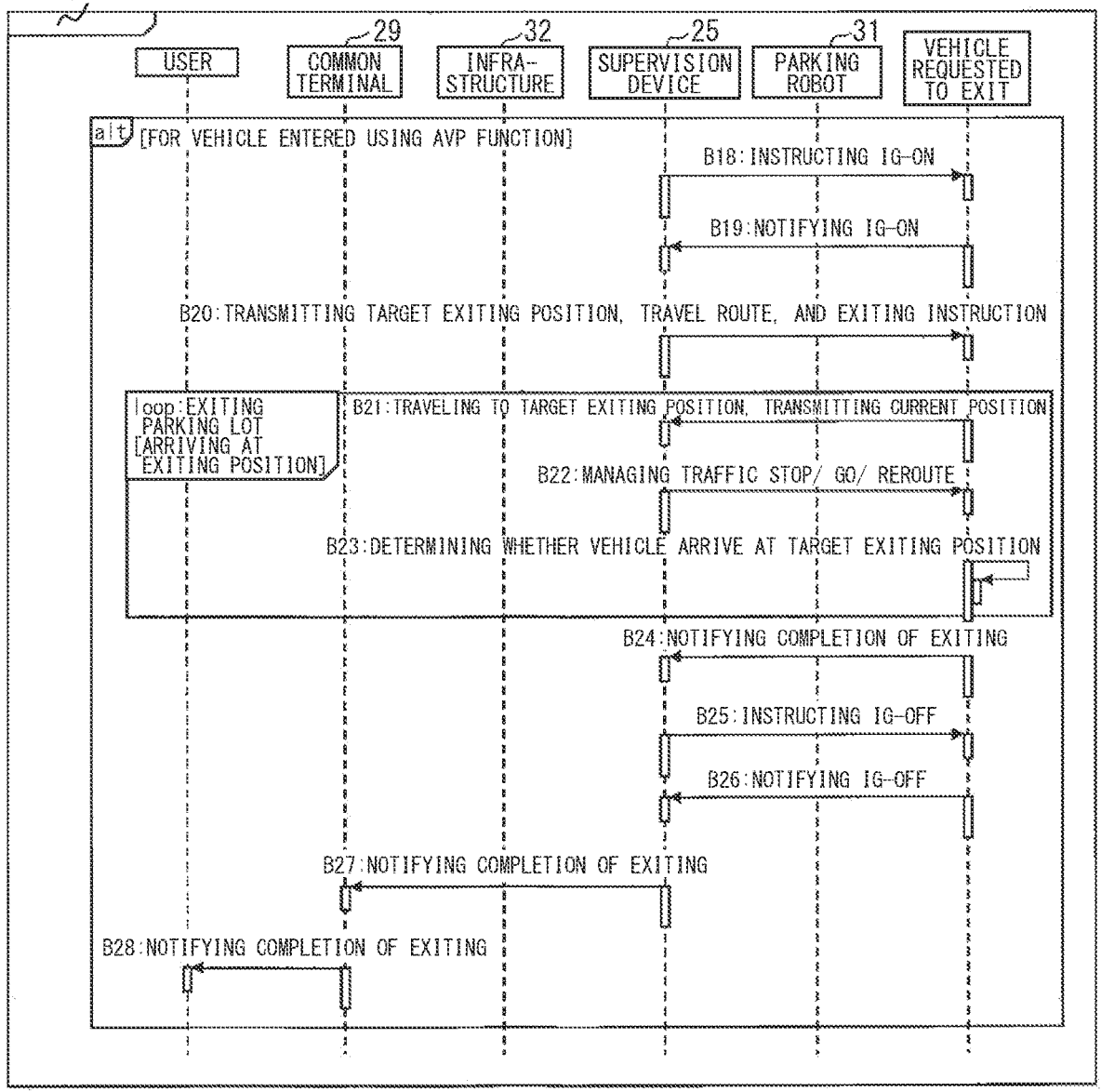
FIG. 9 is a sequence diagram showing process of exiting the parking lot performed by the control system and the vehicle.

4. Processing Related to Exiting Executed by the Control System 23 and the Vehicle Requested to Exit The processing related to exiting executed by the control system 23 and the vehicle requested to exit will be described with reference to FIGS. 8 to 9.

In process B1, the user makes a reservation for exiting or an exiting request to the common terminal 29. The user inputs identification information of the user and identification information of the vehicle requested to exit into the common terminal 29. The vehicle requested to exit is the vehicle 11 that has been requested to exit the parking lot by the exiting request.

In process B2, the common terminal 29 makes the reservation for exiting or the exiting request to the control device 25. When the common terminal 29 transmits the reservation for exiting, the following processes are executed according to the reserved time of the reservation for exiting. When the common terminal 29 sends a delivery request, the following processes are immediately executed.

When the vehicle requested to exit is parked by robot parking, the processes B3-B17 are executed. When the vehicle 11 is parked by AVP function of the vehicle requested to exit, the processes B18-B28 are executed.

In process B3, the control device 25 transmits position information of the vehicle requested to exit, the travel route, and pick-up instruction to the parking robot 31. The position of the vehicle requested to exit is the current position of the vehicle requested to exit. The travel route is a travel route from the current position of the parking robot 31 to the current position of the vehicle requested to exit. The pick-up instruction is an instruction to pick up the vehicle requested to exit.

The processes B4-B6 are repeated until the parking robot 31 arrives at the position of the vehicle requested to exit. In process B4, the parking robot 31 travels toward the position of the vehicle requested to exit and transmits the current position of the parking robot 31 to the control device 25.

In process B5, the control device 25 manages traffic based on the current position of the parking robot 31 received in process B4. The control device 25 transmits instructions to stop, start, and reroute to the parking robot 31 as necessary. The parking robot 31 stops, starts, and reroutes according to the instruction.

In process B6, the parking robot 31 determines whether or not the parking robot 31 has arrived at the position of the vehicle requested to exit. When the parking robot 31 has not yet arrived at the position of the vehicle requested to exit, the process returns to process B4. When the parking robot 31 arrives at the position of the vehicle requested to exit, the processes B4-B6 are completed, and the process B7 is executed.

In process B7, the parking robot 31 notifies the control device 25 as to the parking robot 31 has arrived at the position of the vehicle requested to exit.

In process B8, the control device 25 instructs the parking robot 31 to lift up the vehicle requested to exit.

In process B9, the parking robot 31 lifts up the vehicle requested to exit. When the vehicle requested to exit is lifted up, process B10 is executed.

In process B10, the parking robot 31 notifies the control device 25 of the completion of lifting up.

In process B11, the control device 25 transmits target exiting position information, travel route, and exiting instruction to the parking robot 31. The target exiting position is one of the plurality of exit sections 15. The target exiting position information is position information indicating the target exiting position. The travel route is a travel route from the current position of the parking robot 31 to the target exiting position. The exiting instruction is an instruction to direct the vehicle requested to exit to the target exiting position.

The processes B12-B14 are repeated until the parking robot 31 arrives at the target exiting position. In process B12, the parking robot 31 travels toward the target exiting position and transmits the current position of the parking robot 31 to the control device 25.

In process B13, the control device 25 manages traffic based on the position of the parking robot 31 received in process B12. The control device 25 transmits instructions to stop, start, and reroute to the parking robot 31 as necessary. The parking robot 31 stops, starts, and reroutes according to the instruction.

In process B14, the parking robot 31 determines whether or not the parking robot 31 has arrived at the target exiting position. When the parking robot 31 has not yet arrived at the target exiting position, the process returns to process B12. When the parking robot 31 arrives at the target exiting position, the processes B12-B14 are completed, and the process B15 is executed.

In process B15, the parking robot 31 notifies the control device 25 of completion of the exiting.

In process B16, the control device 25 notifies the common terminal 29 of the completion of the exiting. The control device 25 may notify the smartphone of the completion of the exiting.

In process B17, the common terminal 29 notifies the user of the completion of the exiting. The smartphone may notify the user of the completion of the exiting.

In process B18, the control device 25 transmits an ignition-on instruction to the vehicle 11 requested to exit. The vehicle requested to exit turns on the ignition in response to the ignition-on instruction.

In process B19, the vehicle requested to exit transmits ignition on notification to the control device 25.

In process B20, the control device 25 transmits target exiting position, travel route, and exiting instruction to the vehicle requested to exit. The travel route is a travel route from the current position of the vehicle requested to exit to the target exiting position.

The processes B21-B23 are repeated until the vehicle requested to exit arrives at the target exiting position. In process B21, the vehicle requested to exit travels toward the target exiting position and transmits the current position of the vehicle requested to exit to the control device 25.

In process B22, the control device 25 manages traffic based on the current position of the vehicle requested to exit received in process B21. The control device 25 transmits instructions to stop, start, and reroute to the vehicle requested to exit as necessary. The vehicle requested to exit stops, starts, and reroutes according to the instruction.

In process B23, the vehicle requested to exit determines whether or not the vehicle requested to exit has arrived at the target exiting position. When the vehicle requested to exit has not yet arrived at the target exiting position, the process returns to process B21. When the vehicle requested to exit arrives at the target exiting position, the processes B21-B23 are completed, and the process B24 is executed.

In process B24, the vehicle requested to exit notifies the control device 25 of completion of the exiting.

In process B25, the control device 25 instructs the vehicle requested to exit to turn off the ignition. The vehicle requested to exit turns off the ignition.

In process B26, the vehicle requested to exit notifies the control device 25 that the ignition has been turned off.

In process B27, the control device 25 notifies the common terminal 29 of the completion of the exiting. The control device 25 may notify the smartphone of the completion of the exiting.

In process B28, the common terminal 29 notifies the user of the completion of the exiting. The smartphone may notify the user of the completion of the exiting.

5. Effects of the Control Device 25 and the Parking Lot System (1A) The control device 25 calculates the static estimation accuracy as the positional estimation accuracy before the vehicle 11 starts parking using AVP function. Parking using AVP function corresponds to automatic driving. The control device 25, for example, can prevent the vehicle 11 having low static estimation accuracy by AVP function. As a result, the control device 25 can reduce accidents in the automated valet parking lot 1, reduce emergency stop of the vehicle 11 with AVP function, and the like.

(1B) The control device 25 acquires the estimated position of the vehicle 11, from the vehicle 11 when the vehicle 11 stops. The control device 25 measures the position of the stationary vehicle 11 using the infrastructure 32. The control device 25 calculates the positional estimation accuracy and the static estimation accuracy based on the difference between the position of the vehicle 11 estimated by the vehicle 11 and the position of the vehicle 11 measured by the infrastructure 32. Therefore, the control device 25 can calculate the static estimation accuracy more accurately.

(1C) When the static estimation accuracy is less than a pre-determined static reference accuracy, the control device 25 notifies the user of the vehicle 11. Therefore, the user of the vehicle 11 knows that the static estimation accuracy is less than the static reference accuracy.

(1D) When the static estimation accuracy is less than the pre-determined static reference accuracy, the control device 25 transports the vehicle 11 to the parking space 8 using the parking robot 31. Therefore, the control device 25 can prevent the vehicle 11 having low static estimation accuracy using AVP function. As a result, the control device 25 can reduce accidents in the automated valet parking lot 1, reduce emergency stop of the vehicle 11 with AVP function, and the like.

(1E) The control device 25 acquires a relative position of the marker 69 and the stationary vehicle 11 from vehicle 11, which is estimated by the in-vehicle sensor 67. The control device 25 measures information related to the relative position of the marker 69 and the stationary vehicle 11 using the infrastructure 32. The control device 25 calculates the static measurement accuracy of the in-vehicle sensor 67 based on the difference between the relative position of the vehicle 11 acquired from the vehicle 11 and the relative position measured by the infrastructure 32. The control device 25, for example, can prevent the vehicle 11 having low static measurement accuracy of the in-vehicle sensor 67 by using AVP function. As a result, the control device 25 can reduce accidents in the automated valet parking lot 1, reduce emergency stop of the vehicle 11 with AVP function, and the like.

(1F) When the static measurement accuracy of the in-vehicle sensor 67 is less than a pre-determined static reference measurement accuracy, the control device 25 notifies the user of the vehicle 11. Therefore, the user of the vehicle 11 knows that the static measurement accuracy of the in-vehicle sensor 67 is less than the static reference measurement accuracy.

(1G) The parking lot system includes the white line 71. The parking lot system can guide the vehicle 11 to move inside of the white line 71 when calculating the positional estimation accuracy of the vehicle 11. When the vehicle 11 is inside the white line 71, the in-vehicle camera 65 takes photographs of the marker 69. As a result, the control device 25 can accurately calculate the positional estimation accuracy of the vehicle 11.

Second Embodiment

1. Difference from the First Embodiment

A basic configuration of the second embodiment is the same as that of the first embodiment, and therefore, differences from the first embodiment will be described below. The same reference numerals as in the first embodiment denote the same components, and reference is made to the preceding description.

Figure 13:
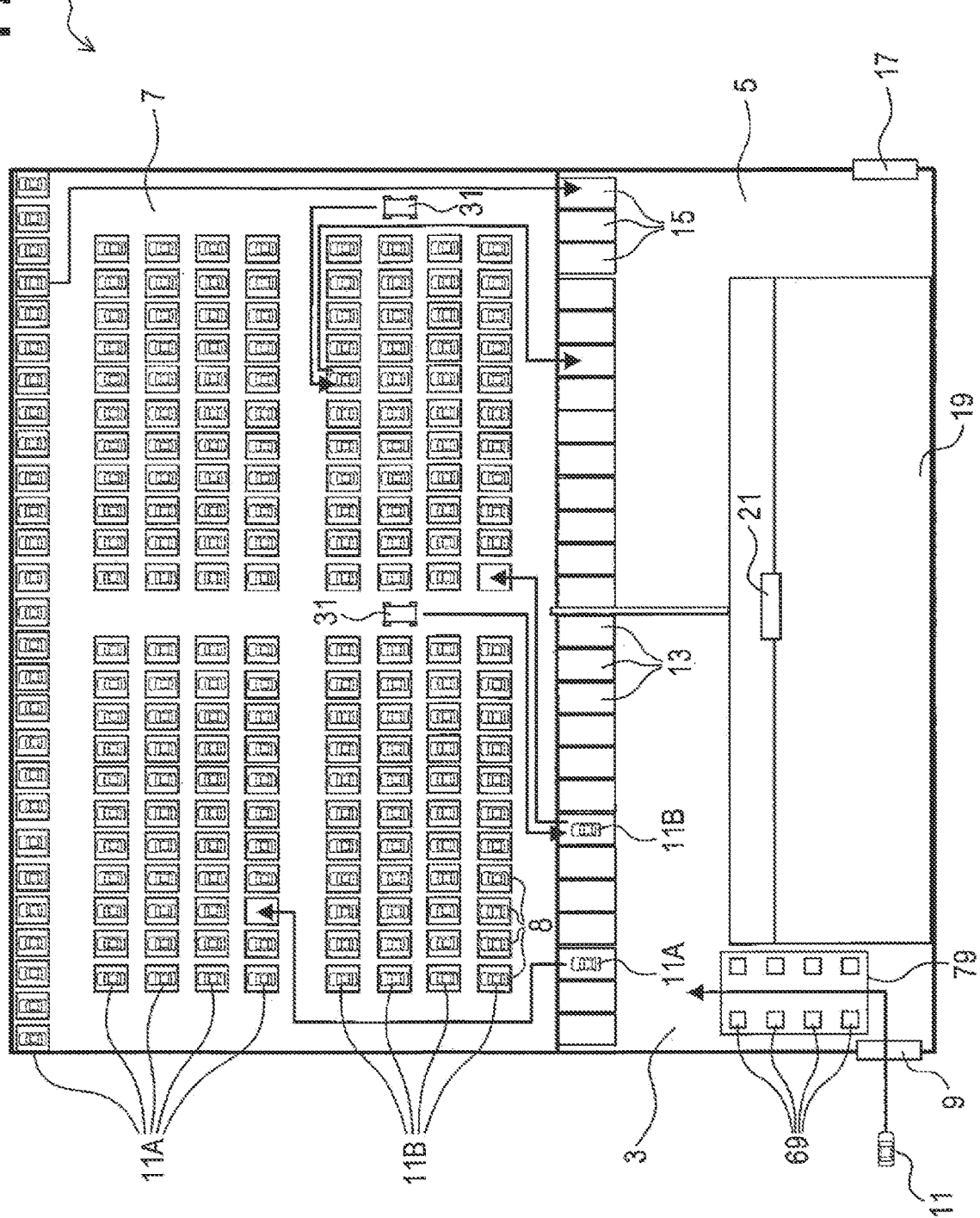
FIG. 13 is an explanatory diagram showing the configuration of an automated valet parking lot according to a second embodiment.

In the first embodiment as described above, the automated valet parking lot 1 has the configuration as shown in FIG. 1. On the other hand, the second embodiment is different from the first embodiment in that the automated valet parking lot 1 of the second embodiment has the configuration as shown in FIG. 13.

The entrance 9 in the second embodiment includes a retractable gate. Therefore, the vehicle 11 trying to enter the automated valet parking lot 1 decelerates and temporarily stops in front of the entrance 9, and after the gate opening, enters the entry space 3 in the automated valet parking lot 1 through the entrance 9. Since the vehicle temporarily stops in front of the entrance 9, the speed of the vehicle 11 before, at, and after entering the entrance 9 is lower than the speed when the entrance 9 does not include the retractable gate. For example, the vehicle 11 is driving slowly before, at, and after entering the entrance 9. The entrance 9 in the second embodiment corresponds to a speed suppressor. The entry space 3 in the second embodiment corresponds to the travelling space.

The automated valet parking lot 1 in the second embodiment includes a dynamic determination space 79 on the route from the entrance 9 to the entry section 13 in the entry space 3. The vehicle 11 heading from the entrance 9 to the entry section 13 passes through the dynamic determination space 79, regardless of which entry section 13 is headed to. Since the dynamic determination space 79 in the second embodiment is located immediately after the entrance 9, the vehicle 11 passes through the dynamic determination space 79 at a relatively low speed. The range in which the dynamic determination space 79 in the second embodiment is located, is within the travelling space. A marker 69 is provided in the dynamic determination space 79. Marker 69 in the dynamic determination space 79, for example, is drawn on the floor at regular intervals.

In the second embodiment, a portion of the camera included in the infrastructure 32 takes photographs for the number plate of the vehicle 11 travelling in the dynamic determination space 79. In the second embodiment, a portion of the camera provided in the infrastructure 32 takes photographs for the vehicle 11 travelling in the dynamic determination space 79 and the marker 69 in the dynamic determination space 79 at the same time.

2. Processing Related to Entering Performed by the Control System 23 and the Vehicle 11

In the second embodiment, when the infrastructure 32 notifies the position of the user and the vehicle 11 in the process A10, the control device 25 calculates the positional estimation accuracy and the measurement accuracy of the in-vehicle sensor 67 while the vehicle 11 is running. Hereinafter, the position estimation accuracy when the vehicle 11 is travelling is referred to as the dynamic estimation accuracy. The measurement accuracy of the in-vehicle sensor 67 when the vehicle 11 is travelling, is defined as the dynamic measurement accuracy of the in-vehicle sensor 67. The process of calculating the dynamic estimation accuracy and the dynamic measurement accuracy of the in-vehicle sensor 67 is executed in parallel with the processes A11-A15. The process of calculating the dynamic estimation accuracy and the dynamic measurement accuracy of the in-vehicle sensor 67 is described with reference to FIGS. 14-16.

Figure 14:
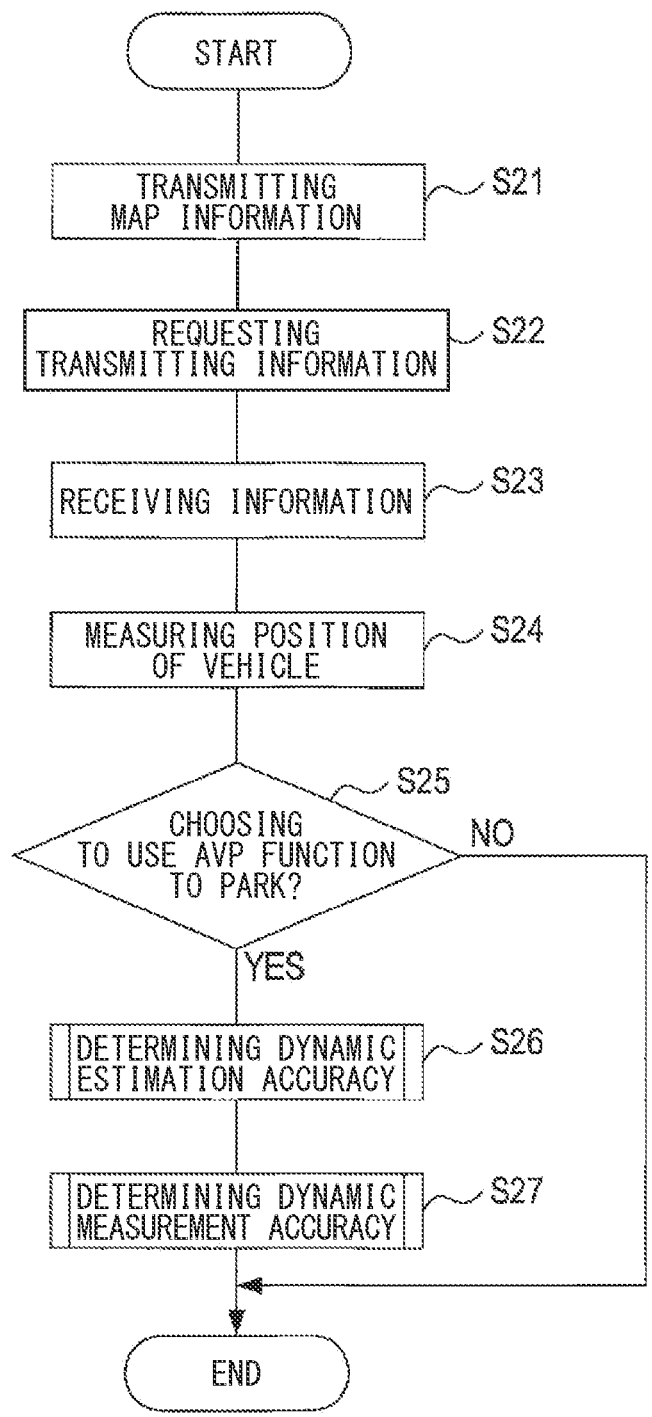
FIG. 14 is a flowchart showing a processes of calculating the dynamic estimation accuracy and the dynamic measurement accuracy of the in-vehicle sensor.

In step 21 shown in FIG. 14, the support unit 58 transmits the map information of the dynamic determination space 79 to the vehicle 11. The map information of the dynamic determination space 79 specifies the position and type of the marker 69 provided in the dynamic determination space 79.

In step 22, the support unit 58 requests the vehicle 11 to transmit information. The information includes the above information (a) and (b), the information indicating the estimated time for each of the abovementioned (a) and the abovementioned (b), and identification information of the vehicle 11. The method for creating the information in (a) and (b) is described in detail in the process A16. Alternatively, the vehicle 11 uses the map information of the dynamic determination space 79 instead of the map information of the entry section 13 in order to read the absolute position of the marker 69 provided in the dynamic determination space 79. The estimated time for the abovementioned (a) is a time at which the vehicle 11, in creating the information (a), using the in-vehicle camera 65 to determine the time for taking photographs of the range including the marker 69 in the determination space 79. The estimated time for the abovementioned (b) is a time at which the vehicle 11, in creating the information (b), using the in-vehicle sensor 67 to determine the time for detecting a detecting target such as the marker 69 in the determination space 79. The identification information of the vehicle 11 is information for identifying the vehicle 11, for example information indicating a vehicle identification number (VIN), a vehicle registration number, or the like.

The vehicle 11, which is requested to send information from the support unit 58 in step 22, creates the information (a) and (b) while the vehicle is being driven by the user (i.e. manual driving) in the dynamic determination space 79. Then, the vehicle 11 transmit the above information (a) and (b), the information indicating the estimated time for each of the abovementioned (a) and the abovementioned (b), and identification information of the vehicle 11, to the control device 25. The vehicle 11 is a vehicle 11A with AVP function.

In step 23, the position acquiring unit 57 receives the above information (a) and (b), the information indicating the estimated time for each of the abovementioned (a) and the abovementioned (b), and identification information of the vehicle 11, from the vehicle 11. If the position acquisition unit 57 cannot receive the abovementioned information from the vehicle 11, such as when the vehicle 11 is a vehicle 11B without AVP function, the process shown in FIG. 14 may be terminated without further processing.

In step 24, the absolute position measurement unit 59 measures the position of the vehicle 11 when travelling in the dynamic determination space 79 using the infrastructure 32. The position measurement unit 59 records information indicating the measured absolute position of the vehicle 11 and the measurement time thereof in the memory 39 The relative position measurement unit 49 measures the position of the vehicle 11 when travelling in the dynamic determination space 79 and relative position of the marker 69 in the dynamic determination space 79 using the infrastructure 32. The relative position measurement unit 49 records information indicating the measured relative position and the measurement time thereof in the memory 39

In step 25, the support unit 58 acquiring identification information of the vehicle 11 in the entry section 13 by taking photograph for the number plate of the vehicle 11 in the entry section 13 using the camera in the entry section 13 included in the infrastructure 32, and inquires to an external server (not shown). When the identification information of the vehicle 11 is input to the individual terminal 27 in the process A14, the support unit 58 may receive the identification information of the vehicle 11 from the individual terminal 27 in the process A15.

In step 25, the support unit 58 determines whether the user has selected parking by AVP function or robot parking based on the information received from the individual terminal 27 in the process A15. When the user selects parking by AVP function, step 26 is performed. When the user selects robot parking, the present process completes.

Figure 15:
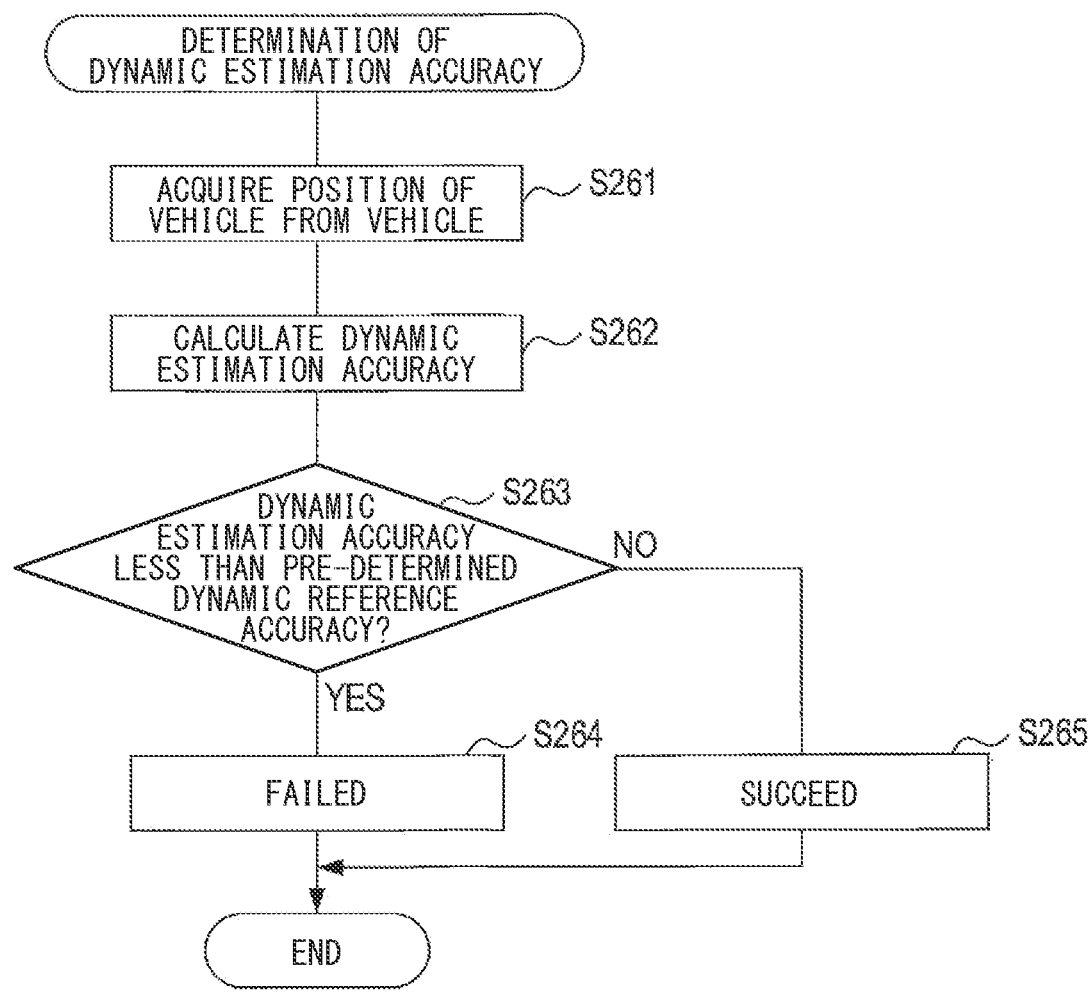
FIG. 15 is a flowchart showing a processes of determining the dynamic estimation accuracy when calculating the dynamic estimation accuracy and the dynamic measurement accuracy of the in-vehicle sensor.

In step 26, the control device 25 determines the dynamic estimation accuracy, as shown in FIG. 15.

In step 261, the position acquisition unit 57 identifies the information (a) and the information indicating the estimated time for information (a), corresponding to the vehicle 11 in the entry section 13, based on, for example, the identification information of the vehicle 11 received from the vehicle 11 in the step 23 and the identification information of the vehicle 11 in the entry section 13 acquired in the step 25. Then, the position acquisition unit 57 acquires the position of the vehicle 11 estimated by the vehicle 11 while travelling in the dynamic determination space 79 from the information (a).

In step 262, the calculation unit 61 calculates the dynamic estimation accuracy based on the difference between the position of the vehicle 11 acquired in the step 261, and the position of the vehicle 11 acquired in the step 24 at the same time t1 as the estimated time for the position of the vehicle 11 acquired in step 261. The smaller the difference, the higher the dynamic estimation accuracy. The estimated time for acquiring position of the vehicle 11 in step 261 is the estimated time for the information (b) specified in step 261. When the position of the vehicle 11 at the time t1 was not measured in the step 24, the position measurement unit 59 measures the position of the vehicle 11 before time t1 and after time t1 and calculates the position of the vehicle 11 at the time t1 by interpolation calculation. The calculation unit 61 calculates dynamic estimation accuracy based on the position of the vehicle 11 at the time t1 calculated by the interpolation calculation in position measurement unit 59.

In step 263, the accuracy determination unit 42 determines whether or not the dynamic estimation accuracy calculated in step 262 is less than the pre-determined dynamic reference accuracy. If the dynamic estimation accuracy is less than the dynamic reference accuracy, step 264 is executed. If the dynamic estimation accuracy is higher than the dynamic reference accuracy, step 265 is executed.

In step 264, the accuracy determination unit 42 determines that the dynamic estimation accuracy is failed.

In step 265, the accuracy determination unit 42 determines that the dynamic estimation accuracy is succeeded.

In the above process, the position of the vehicle 11 acquired in step 261 and the position of the vehicle 11 measured in step 24 are absolute positions. The position of the vehicle 11 acquired in step 261 and the position of the vehicle 11 measured in step 24 may also be relative positions.

When step 264 or step 265 is completed, this process proceeds to step 27 as shown in FIG. 14.

Figure 16:
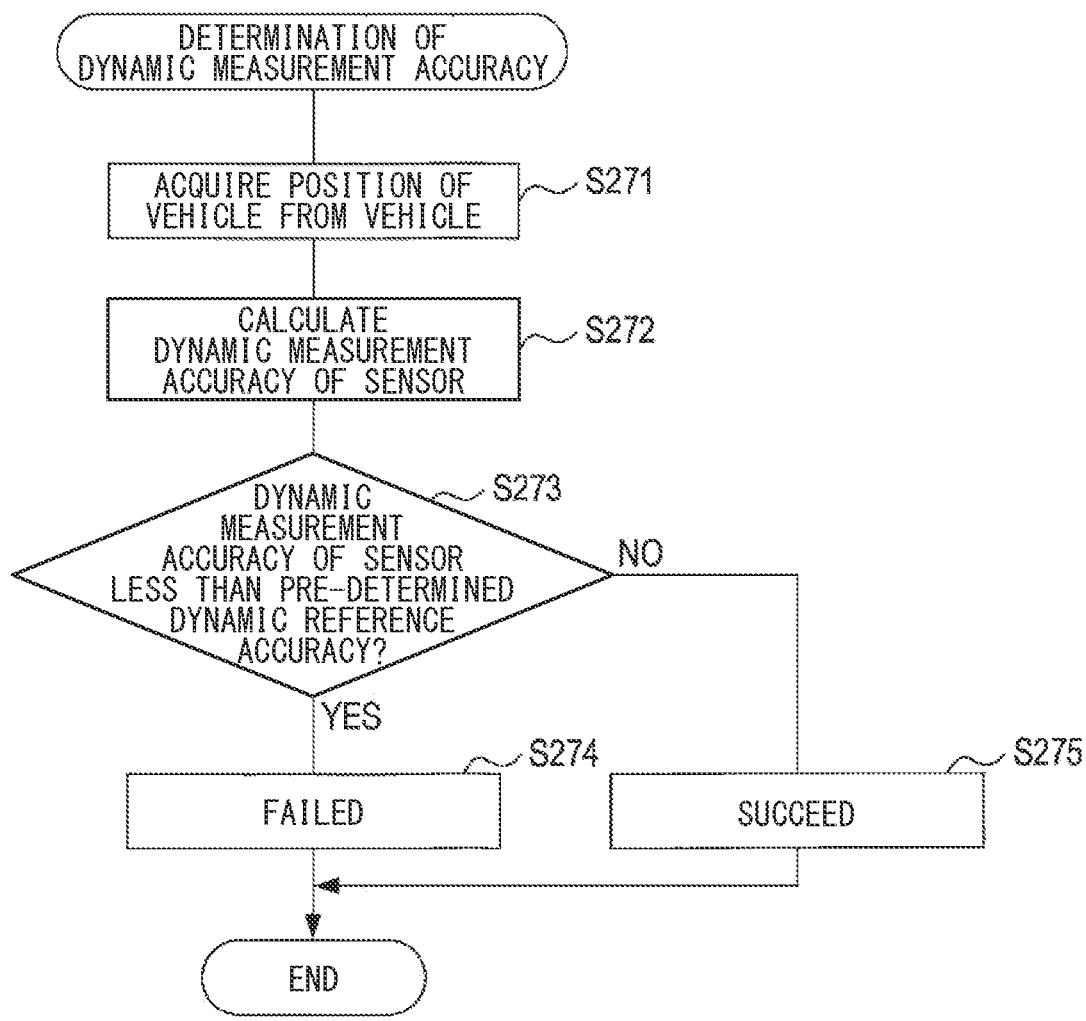
FIG. 16 is a flowchart showing a processes of determining the dynamic measurement accuracy of the in-vehicle sensor when calculating the dynamic estimation accuracy and the dynamic measurement accuracy of the in-vehicle sensor.

In step 27, the control device 25 determines the dynamic measurement accuracy of the in-vehicle sensor 67, as shown in FIG. 16.

In step 271, the relative position acquiring unit 47 identifies the information (b) and estimated time of the information (b) corresponding to the vehicle 11 in the entry section 13, in the same manner as the above step 261. Then, the relative position acquisition unit 47 acquires the relative position of the vehicle 11 estimated by the vehicle 11 while travelling in the dynamic determination space 79 from the information (b). The relative position of the vehicle 11 is a relative position between the vehicle 11 when travelling in the dynamic determination space 79 and the marker 69 in the dynamic determination space 79.

In step 272, the sensor accuracy calculation unit 51 calculates the dynamic measurement accuracy of the in-vehicle sensor 67 based on the difference between the relative position of the vehicle 11 acquired in the step 271, and the relative position of the vehicle 11 acquired in the step 24 at the same time t2 as the estimated time for the relative position of the vehicle 11 acquired in step 271. The smaller the difference, the higher the dynamic measurement accuracy of the in-vehicle sensor 67. The estimated time for acquiring relative position of the vehicle 11 in step 271 is the estimated time for the information (b) specified in step 271. When the relative position of the vehicle 11 at the time t2 was not measured in the step 24, the relative position measurement unit 49 measures the relative position of the vehicle 11 before time t2 and after time t2 and calculates the relative position of the vehicle 11 at the time t2 by interpolation calculation. The sensor accuracy calculation unit 51 calculates dynamic measurement accuracy of the in-vehicle sensor 67 based on the relative position of the vehicle 11 at the time t2 calculated by interpolation calculation in relative position measurement unit 49.

In step 273, the accuracy determination unit 42 determines whether or not the dynamic measurement accuracy of the in-vehicle sensor 67 calculated in step 272 is less than the pre-determined dynamic reference measurement accuracy. If the dynamic measurement accuracy is less than the dynamic reference measurement accuracy, step 274 is executed. If the dynamic measurement accuracy is higher than the dynamic reference measurement accuracy, step 275 is executed.

In step 274, the accuracy determination unit 42 determines that the dynamic measurement accuracy of the in-vehicle sensor 67 is failed.

In step 275, the accuracy determination unit 42 determines that the dynamic measurement accuracy of the in-vehicle sensor 67 is succeeded.

When steps 274 and 275 are completed, the process shown in FIG. 14 is completed. After such processes are completed, the process after process A16 is performed.

In the above first embodiment, when it is determined that the static estimation accuracy is failed, when it is determined that the static measurement accuracy of the in-vehicle sensor 67 is failed, or when the above information (c) is inconsistent with the parking lot and the vehicle 11, the processes A18 to A19 are performed. In the second embodiment, in addition to the above, when it is determined that the dynamic estimation accuracy is failed, and it is determined that the dynamic measurement accuracy of the in-vehicle sensor 67 is failed, the processes A18 to A19 are performed.

The specific notification in process A18 is basically the same as the notification in the first embodiment. When it is determined that the dynamic estimation accuracy has failed, the notification unit 43 notifies the individual terminals 27 that the dynamic estimation accuracy has failed. When it is determined that the dynamic measurement accuracy of in-vehicle sensor 67 has failed, the sensor notification unit 53 notifies the individual terminals 27 that the dynamic measurement accuracy of the in-vehicle sensor 67 has failed. The control device 25 may notify the smartphone.

3. Effects of the Control Device 25 and the Parking Lot System

According to the second embodiment described in detail above, the following effects are further provided in addition to the effects of the first embodiment described above.

(2A) The control device 25 calculates the dynamic estimation accuracy as the positional estimation accuracy before the vehicle 11 starts parking using AVP function. Parking using AVP function corresponds to automatic driving. The control device 25, for example, can prevent the vehicle 11 having low dynamic estimation accuracy by AVP function. As a result, the control device 25 can reduce accidents in the automated valet parking lot 1, reduce emergency stop of the vehicle 11 with AVP function, and the like.

(2B) The control device 25 acquires the estimated position of the stationary vehicle 11, from the vehicle 11 while travelling in the entry space 3 with entrance 9 for decelerating the vehicle 11. The entrance 9 corresponds to a speed suppressor. The entry space 3 corresponds to the travelling space.

When the vehicle 11 parks using AVP function, the travelling speed of the vehicle 11 is relatively low. According to the above configuration, the control device 25 calculates the dynamic estimation accuracy when the vehicle 11 travels at a speed close to the speed when using AVP function.

(2C) The control device 25 acquires the estimated position of the stationary vehicle 11, from the vehicle 11 while travelling. The control device 25 measures the position of the travelling vehicle 11 using the infrastructure 32. The control device 25 calculates the positional estimation accuracy and the dynamic estimation accuracy based on the difference between the position of the vehicle 11 estimated by the vehicle 11 and the position of the vehicle 11 measured by the infrastructure 32. Therefore, the control device 25 can calculate the dynamic estimation accuracy more accurately.

(2D) When the dynamic estimation accuracy is less than a pre-determined dynamic reference accuracy, the control device 25 notifies the user of the vehicle 11. Therefore, the user of the vehicle 11 knows that the dynamic estimation accuracy is less than the dynamic reference accuracy.

(2E) When the dynamic estimation accuracy is less than the pre-determined dynamic reference accuracy, the control device 25 transports the vehicle 11 to the parking space 8 using the parking robot 31. Therefore, the control device 25 can prevent the vehicle 11 having low dynamic estimation accuracy using AVP function. As a result, the control device 25 can reduce accidents in the automated valet parking lot 1, reduce emergency stop of the vehicle 11 with AVP function, and the like.

(2F) The control device 25 acquires a relative position of the marker 69 and the travelling vehicle 11 from vehicle 11, which is estimated by the in-vehicle sensor 67. The control device 25 measures the relative position of the marker 69 and the travelling vehicle 11 using the infrastructure 32. The control device 25 calculates the dynamic measurement accuracy of the in-vehicle sensor 67 based on the difference between the relative position of the vehicle 11 acquired from the vehicle 11 and the relative position measured by the infrastructure 32. The control device 25, for example, can prevent the vehicle 11 having low dynamic measurement accuracy of the in-vehicle sensor 67 by using AVP function. As a result, the control device 25 can reduce accidents in the automated valet parking lot 1, reduce emergency stop of the vehicle 11 with AVP function, and the like.

(2G) When the dynamic measurement accuracy of the in-vehicle sensor 67 is less than a pre-determined dynamic reference measurement accuracy, the control device 25 notifies the user of the vehicle 11. Therefore, the user of the vehicle 11 knows that the dynamic measurement accuracy of the in-vehicle sensor 67 is less than the dynamic reference measurement accuracy.

(2H) The control device 25 calculates both of the static measurement accuracy as the positional estimation accuracy and the dynamic estimation accuracy before the vehicle 11 starts parking using AVP function. In this regard, the control device 25 can further reduce accidents in the automated valet parking lot 1, reduce emergency stop of the vehicle 11 with AVP function, and the like.

Third Embodiment

1. Difference from the First Embodiment

A basic configuration of the third embodiment is the same as that of the first embodiment, and therefore, differences from the first embodiment will be described below. The same reference numerals as in the first embodiment denote the same components, and reference is made to the preceding description.

Figure 17:
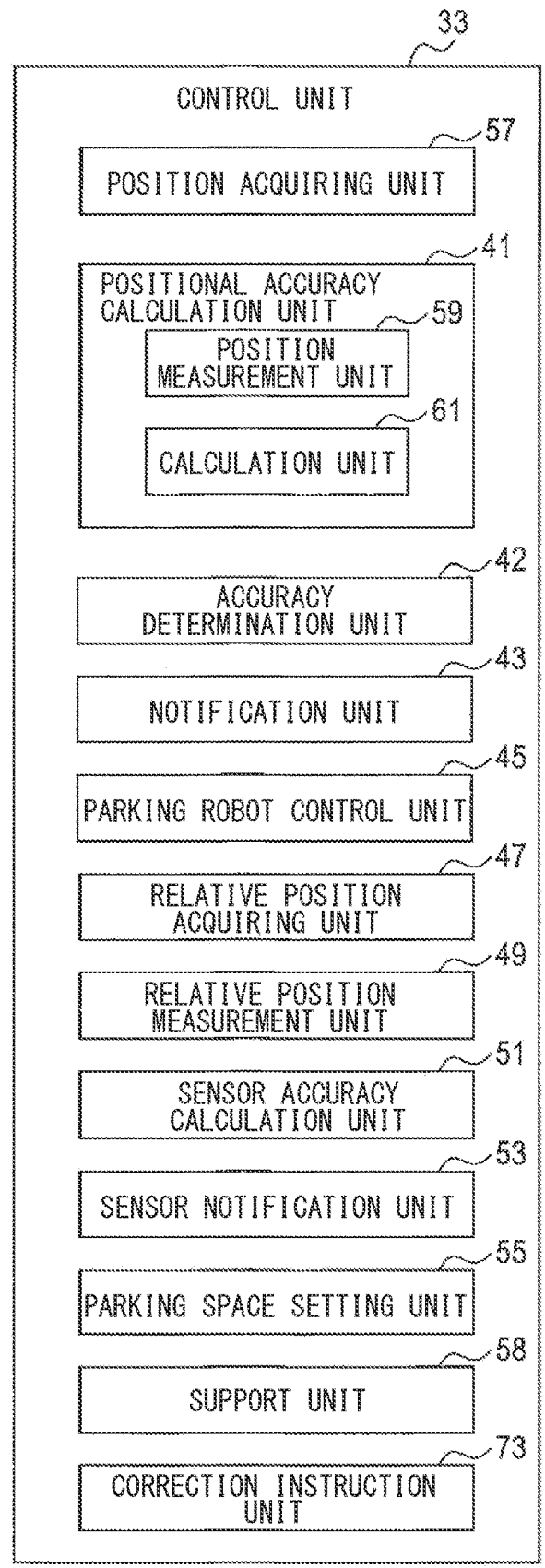
FIG. 17 is a block diagram showing a functional configuration of the control unit in a third embodiment.

In the first embodiment as described above, the control unit 33 has the configuration as shown in FIG. 3. On the other hand, the third embodiment is different from the configuration of the first embodiment in the control unit 33 as shown in FIG. 17. The control unit 33 in the third embodiment, further includes a correction instruction unit 73.

2. Processing Related to Entering Performed by the Control System 23 and the Vehicle 11

As process A17 described above, when it is determined that the static estimation accuracy is failed, the correction instruction unit 73 in the third embodiment instructs the vehicle 11 to correct the in-vehicle camera 65. Content of the correction is to change the angle of the in-vehicle camera 65 such that the position of the vehicle 11 estimated by the vehicle 11 is consistent with the position of the vehicle 11 measured by the infrastructure 32. By executing the correction, the difference between the position of the vehicle 11 estimated by the vehicle 11 and the position of the vehicle 11 measured by the infrastructure 32 is reduced and the static estimation accuracy can be improved. After the abovementioned correction, the parking process by AVP function shown in processes A41-A51 in FIG. 7 are performed.

The correction of the in-vehicle camera 65 is shown as below. For example, the image area to be cropped can be shifted for image recognition. For example, when photographing area is larger than image analysis area, the image analysis area can be a rectangular area shifted 1 cm to the right from that before the correction. The calculated position of the vehicle 11 may be corrected later. For example, it is possible to calculate the position of the vehicle 11 in the same manner as such before the correction, and then perform the correction to move the position of the vehicle 11 3 cm to the right.

Alternatively, as disclosed in the above process A17, when it is determined that the static measurement accuracy of the in-vehicle sensor 67 has failed, or when the above information (c) is inconsistent with the parking lot and the vehicle 11, the processes A26-A40 are performed.

3. Effects of the Control Device 25 and the Parking Lot System

According to the third embodiment described in detail above, the following effects are further provided in addition to the effects of the first embodiment described above.

(3A) When the static estimation accuracy is less than a pre-determined static reference accuracy, the control device 25 instructs the vehicle 11 to correct the in-vehicle camera 65. In this regard, the static estimation accuracy of the vehicle 11 can be improved. For example, even if the static estimation accuracy is less than the static reference accuracy in the beginning, the in-vehicle camera 65 can be corrected and then AVP function can be used to park.

Fourth Embodiment

1. Difference from the First Embodiment

A basic configuration of the fourth embodiment is the same as that of the first embodiment, and therefore, differences from the first embodiment will be described below. The same reference numerals as in the first embodiment denote the same components, and reference is made to the preceding description.

In the above first embodiment, when the static measurement accuracy of the in-vehicle sensor 67 is determined as fail, the parking method is robot parking. On the other hand, in the fourth embodiment, even if the static measurement accuracy of the in-vehicle sensor 67 is determined as fail, once the static estimation accuracy is acceptable and the AVP system is consistent with the parking lot and the vehicle 11, AVP function is used for parking.

Alternatively, when the static measurement accuracy of the in-vehicle sensor 67 is determined as fail, the parking space 8, which is the target parking position, is enlarged and the parking space 8 is moved closer to the entry sections 13, compared to the situation when the static measurement accuracy of the in-vehicle sensor 67 is determined as succeed.

2. Effects of the Control Device 25 and the Parking Lot System

According to the fourth embodiment described in detail above, the following effects are further provided in addition to the effects of the first embodiment described above.

(4A) By enlarging the parking space 8 or moving the parking space 8 closer to the entry sections 13, even if the static measurement accuracy of the in-vehicle sensor 67 is determined as fail, it is still possible to reduce the possibility of accident at the automated valet parking lot 1 or the emergency stop of the vehicle 11 with AVP function.

OTHER EMBODIMENTS

Although the embodiments of the present disclosure have been described above, the present disclosure is not limited to the above-described embodiments, and various modifications can be made.

(1) Another guidance unit may be used to replace the white line 71 or in addition to the white line 71. Other example of the guidance unit includes monitors installed in each of the plurality of entry sections 13. The user of the vehicle 11 can visually recognize the monitor. The monitor displays the current position and the target position of the vehicle 11 in the entry sections 13. The user can guide the vehicle 11 from the current position to the target position while looking at the monitor. When the vehicle 11 stops at the target position as shown in the monitor, the in-vehicle camera 65 takes a picture of the marker 69, and the in-vehicle sensor 67 detects the marker 69 and the white line 71.

(2) When the dynamic estimation accuracy is determined as failed in the second embodiment described above, for example, the in-vehicle camera 65 may be corrected. The content of the correction of the in-vehicle camera 65 is, for example, the same as the content of the correction in the third embodiment described above. After the correction of the in-vehicle camera 65, for example, parking using AVP function may be performed instead of robot parking.

In view of such configuration, when the dynamic estimation accuracy is less than a pre-determined dynamic reference accuracy, the control device 25 instructs the vehicle 11 to correct the in-vehicle camera 65. In this regard, the dynamic estimation accuracy of the vehicle 11 can be improved. For example, even if the dynamic estimation accuracy is less than the dynamic reference accuracy in the beginning, the in-vehicle camera 65 can be corrected and then AVP function can be used to park.

(3) In the second embodiment, once the dynamic estimation accuracy is acceptable and the AVP system is consistent with the parking lot and the vehicle 11, even though the dynamic measurement accuracy of the in-vehicle sensor 67 is failed, parking will be performed by AVP function, rather than robot parking. Alternatively, when the dynamic measurement accuracy of the in-vehicle sensor 67 is determined as fail, the parking space 8, which is the target parking position, is enlarged and the parking space 8 is moved closer to the entry sections 13, compared to the situation when the dynamic measurement accuracy of the in-vehicle sensor 67 is determined as succeed.

By having the present configuration, even if the dynamic measurement accuracy of the in-vehicle sensor 67 is determined as fail, it is still possible to reduce the possibility of accident at the automated valet parking lot 1 or the emergency stop of the vehicle 11 with AVP function.

(4) In the above embodiment, since the positional estimation accuracy, the measurement accuracy of the in-vehicle sensor 67, and the consistency between the parking lot and the vehicle 11 determine the parking method, the control device 25 requests the vehicle 11 at process A16 to transmit the above-mentioned information (a)-(c). Alternatively, the parking method may be determined based on at least one of the positional estimation accuracy, the measurement accuracy of the in-vehicle sensor 67, and the consistency between the parking lot and the vehicle 11. Which is to say, the control device 25 may request the vehicle 11 to transmit one or two of the information (a)-(c), rather than all of the information.

(5) When calculating the static estimation accuracy as the positional estimation accuracy, the position of the vehicle 11 may be any location other than the entry sections 13. For example, the static estimation accuracy of the vehicle 11 may be calculated on the route from the entrance 9 to the entry section 13. For example, the static estimation accuracy can be calculated by using the marker 69 in the entry space 3 as shown in FIG. 1.

The positional estimation accuracy of the vehicle 11 may be calculated while the vehicle 11 is travelling. In this case, for example, at the same time t, the vehicle 11 estimates the position of the vehicle 11, and the infrastructure 32 measures the position of the vehicle 11. Then, the positional estimation accuracy of the vehicle 11 is calculated based on the difference between the position of the vehicle 11 estimated by the vehicle 11 and the position of the vehicle 11 measured by the infrastructure 32.

If the position of the vehicle 11 at the time t cannot be measured by the infrastructure 32, the position of the vehicle 11 at time t can be calculated by interpolation calculation from the position of the vehicle 11 measured before the time t by the infrastructure 32 and the position of the vehicle 11 measured after the time t by the infrastructure 32. The positional estimation accuracy of the vehicle 11 can be calculated by the above method using the position of the vehicle 11 at the time t calculated by the interpolation calculation.

(6) The location of the vehicle 11 calculated by the dynamic estimation accuracy as the position estimation accuracy includes, for example, a curve, a narrowness, a hump, a sign indicating stop or deceleration, a road marking, a display for showing a signal, or the like. The travelling speed of the vehicle 11 is relatively low before, at and after the curve or the like. In this regard, the dynamic estimation accuracy can be calculated when the vehicle 11 travels at a speed close to the speed when using AVP function. The curve corresponds to the speed suppressor.

(7) The location for calculating the static estimation accuracy, the dynamic estimation accuracy, or both of them as the position estimation accuracy may be, for example, on a route from the outside of the automated valet parking lot 1 to the entrance 9. For example, by providing the marker 69 on the route from the outside of the automated valet parking lot 1 to the entrance 9, and using the infrastructure on the route, the position estimation accuracy of the vehicle 11 can be calculated. At this time, the wireless communication between the control device 25 and the vehicle 11 can be realized by using, for example, a communication standard for mobile phones such as LTE, and the control device 25 transmitting information to the vehicle 11 within a specific communication range.

(8) The dynamic estimation accuracy and the dynamic measurement accuracy of the in-vehicle sensor 67 can be determined before the vehicle 11 arrives at the entry section 13. In other words, regarding the determination of the dynamic estimation accuracy, as in the second embodiment, the position acquiring unit 57 acquires the position of the vehicle 11 from the vehicle 11 (i.e., the information (a)) as estimated by the vehicle 11 when travelling in the dynamic determination space 79, before entering the entry section 13. Then, the position accuracy calculation unit 41 determinates whether or not the dynamic estimation accuracy is less than the pre-determined reference accuracy before the vehicle 11 arrives at the entry section 13, and result of the determination is stored in the memory 39 together with the identification information of vehicle 11. In this regard, as soon as information is transmitted from the individual terminal 27 to the control device 25 at the process A15 for the relevant vehicle 11, the process from the process A16 is performed. The same may also be applied to determination of the dynamic measurement accuracy of the in-vehicle sensor 67.

(9) In the second embodiment described above, only one of the dynamic estimation accuracy and the dynamic measurement accuracy of the in-vehicle sensor 67 is calculated. For example, when the dynamic estimation accuracy is calculated, in the step 22, the support unit 58 is not required to transmit information (b) and the estimated time thereof that can be used to calculate the dynamic measurement accuracy of the in-vehicle sensor 67 to the vehicle 11. On the other hand, when the dynamic measurement accuracy of the in-vehicle sensor 67 is calculated, in the step 22, the support unit 58 is not required to transmit information (a) and the estimated time thereof that can be used to calculate the dynamic estimation accuracy to the vehicle 11.

(10) A part of the camera provided in the infrastructure 32 takes photograph for the vehicle 11 and the marker 69 at the same time. Alternatively, for example, when the position of the camera is fixed, it may only take photograph for the vehicle 11 without the marker 69. When the position of the camera is fixed, the shooting range by the camera is settled, such that the control device 25 can measure the position of the vehicle 11 even if the marker 69 is not in the photograph.

(11) Wireless communication from the control device 25 to the vehicle 11 may be realized by, for example, the control device 25 transmitting information within the communication range.

(12) In the above embodiment, each of the control unit 33 may be provided separately as one or more than one controller or may be provided integrally as one or more than one controller. Such a controller and method thereof described in the present disclosure may be implemented by one or more than one special-purpose computer. Alternatively, the control unit 33 described in the present disclosure and the method thereof may be realized by a dedicated computer configured as a processor with one or more dedicated hardware logic circuits. Alternatively, the control unit 33 and the technique according to the present disclosure may be achieved using one or more dedicated computers constituted by a combination of the processor and the memory programmed to execute one or more functions and the processor with one or more hardware logic circuits. The computer program may store a computer-readable non-transitional tangible recording medium as an instruction to be executed by the computer. The methods of implementing the functions of the units provided in the control units 33 does not necessarily need to include software, and all of the functions may be implemented with the use of one or multiple hardware.

(13) Multiple functions of one configuration element in the above embodiment may be implemented by multiple configuration elements, or a single function of one configuration element may be implemented by multiple configuration elements. Further, multiple functions of multiple components may be implemented by one component, or one function implemented by multiple components may be implemented by one component. A part of the configuration of the above embodiment may be omitted. Further, at least part of the configuration of the above-described embodiment may be added to or replaced with the configuration of another embodiment described above.

(14) Other than the control device 25 as mentioned before, the present disclosure can also be realized in various forms such as the system having the control device 25 as a constituent element, a program for causing a computer to function as the control unit 33 of the control device 25, a non-transitory tangible recording medium such as a semiconductor memory having the program recorded thereon or an automated parking assistance method.

The invention claimed is:

1. A control device for an automated valet parking lot, comprising:
    a travel route determining unit configured to determine a travel route to a parking space;
    a travel route transmission unit configured to transmit the travel route to a vehicle;
    a position acquiring unit configured to acquire, from the vehicle, a position of the vehicle that is estimated by the vehicle while traveling; and
    a positional accuracy calculation unit configured to calculate a dynamic estimation accuracy, which is an accuracy of the position of the vehicle acquired by the position acquiring unit from the vehicle while the vehicle is travelling, prior to performing automated driving of the vehicle in accordance with the travel route,
    wherein
    the control device is provided outside the vehicle and is configured to wirelessly communicate with the vehicle, and
    the positional accuracy calculation unit includes:
        a position measurement unit measures, using a sensor installed in the automated valet parking lot, the position of the vehicle while the vehicle is travelling; and
        a calculation unit configured to calculate the dynamic estimation accuracy based on a difference between the position of the vehicle while travelling, which is acquired by the position acquiring unit, and the position of the vehicle measured by the position measurement unit while travelling.

2. The control device according to claim 1, wherein the position acquiring unit is configured to acquire the position of the vehicle that is estimated while travelling in a travelling space where a speed suppressing portion that causes the vehicle to decelerate is located.

3. The control device according to claim 1, further comprising:
    a notification unit configured to transmit a notification to the user of the vehicle when the dynamic estimation accuracy calculated by the positional accuracy calculation unit is less than a pre-determined reference accuracy.

4. The control device according to claim 1, further comprising:
    a parking robot control unit configured to transport the vehicle to the parking space using a parking robot when the dynamic estimation accuracy calculated by the positional accuracy calculation unit is less than a pre-determined reference accuracy.

5. The control device according to claim 1, further comprising:
    a correction instruction unit configured to instruct the vehicle to correct a sensor used for estimating the position of the vehicle, when the dynamic estimation accuracy calculated by the positional accuracy calculation unit is less than a pre-determined reference accuracy.

6. The control device according to claim 1, further comprising:
    a relative position acquiring unit configured to acquire, from the vehicle, a relative position of the vehicle relative to a reference position set in the automated valet parking lot, the relative position being measured by an in-vehicle sensor used for automatic driving;
    a relative position measurement unit configured to measure the relative position using a sensor in the automated valet parking lot; and
    a sensor accuracy calculation unit configured to calculate a measurement accuracy of the in-vehicle sensor based on a difference between the relative position acquired by the relative position acquiring unit and the relative position measured by the relative position measurement unit.

7. The control device according to claim 6, further comprising:
    a sensor notification unit configured to transmit a notification to the user of the vehicle when the in-vehicle sensor measurement accuracy calculated by the in-vehicle sensor accuracy calculation unit is less than a pre-determined reference measurement accuracy.

8. The control device according to claim 6, further comprising:
    a parking space setting unit configured to set the parking space in a parking area of the automated valet parking lot,
    wherein when the measurement accuracy of the in-vehicle sensor calculated by the sensor accuracy calculation unit is less than a pre-determined reference measurement accuracy, the parking space setting unit is configured to increase the parking space in size or set the parking space at a position closer to the vehicle as compared to that when the measurement accuracy of the in-vehicle sensor is equal to or higher than the pre-determined reference measurement accuracy.

9. The control device according to claim 1, wherein:

the position acquiring unit is configured to acquire the position of the vehicle that is estimated when the vehicle is stopped; and the positional accuracy calculation unit is configured to calculate a static estimation accuracy, which is an accuracy of the position of the vehicle that is acquired by the position acquiring unit when the vehicle is stopped, prior to performing automated driving of the vehicle in accordance with the travel route.

10. A parking lot system comprising:

the control device according to claim 9; and a guidance unit configured to guide the vehicle to a pre-determined position for the positional accuracy calculation unit to calculate the positional estimation accuracy.

11. The control device according to claim 1, further comprising:

at least one processor and at least one memory storing instructions configured to, when executed by the at least one processor, cause the at least one processor to implement the travel route determining unit, the travel route transmission unit, the position acquiring unit and the positional accuracy calculation unit, wherein the positional accuracy calculation unit calculates the dynamic estimation accuracy for each of a plurality of vehicles in the automated valet parking lot.

12. A method for calculating a positional accuracy for a control device in an automated valet parking lot, the method comprising:

determining a travel route to a parking space;

transmitting the travel route to a vehicle;

acquiring, from the vehicle, a position of the vehicle that is estimated while travelling; and calculating a dynamic estimation accuracy, which is an accuracy of the position of the vehicle that is acquired while the vehicle is travelling, prior to performing automatic driving of the vehicle along with the travel route, wherein the control device is provided outside the vehicle and is configured to wirelessly communicate with the vehicle, and calculating the dynamic estimation accuracy includes:

measuring using a sensor installed in the automated valet parking lot, the position of the vehicle while the vehicle is travelling; and is based on a difference between the position of the vehicle while travelling and the position of the vehicle measured by the sensor while travelling.

* * * * *